United States Patent [19]
Montgomery

[11] Patent Number: 5,191,326
[45] Date of Patent: Mar. 2, 1993

[54] COMMUNICATIONS PROTOCOL FOR DIGITAL TELEMETRY SYSTEM

[75] Inventor: Michael A. Montgomery, Cedar Park, Tex.

[73] Assignee: Schlumberger Technology Corporation, Houston, Tex.

[21] Appl. No.: 755,301

[22] Filed: Sep. 5, 1991

[51] Int. Cl.$^5$ .............................................. G01V 1/00
[52] U.S. Cl. .............................. 340/855.5; 340/854.1; 340/855.7; 364/422; /
[58] Field of Search ............... 340/853.2, 853.7, 853.9, 340/855.3, 855.5, 855.6, 855.7, 854.1; 364/421, 422; 370/99, 117; 371/30

[56]  References Cited
U.S. PATENT DOCUMENTS 4,718,011  1/1988  Patterson, Jr. ...................... 364/422
5,010,333  4/1991  Gardner et al. ..................... 340/856

Primary Examiner—Brian S. Steinberger
Attorney, Agent, or Firm—Cox & Smith

[57] ABSTRACT

The present invention relates to a communications protocol for a digital telemetry system which enables more efficient digital data transmission between a plurality of digital communications nodes. The protocol is implemented using uplink and downlink packets and superpackets. Each node forms an uplink packet which contains node data and protocols. Those packets are packaged into uplink superpackets and transmitted to a control node. Downlink superpackets containing information signifying which of the uplink superpackets were received correctly are formed and transmitted to the individual nodes. In response, any uplink superpacket received incorrectly is retransmitted. Additionally, the communications protocol also time stamps messages received from the nodes to provide for digital communications time correlation.

8 Claims, 13 Drawing Sheets

Fig. 7

| Delay Word (11 Bits) | | | | | | | | | | | | | | | | Window Value (10 Bits) | | | | | | | | | | | | | | | IP OP Code | | | | |
|---|---|---|---|---|---|---|---|---|---|---|---|---|---|---|---|---|---|---|---|---|---|---|---|---|---|---|---|---|---|---|---|---|---|---|---|
| 0 | 0 | 0 | 0 | 0 | D10 | D9 | D8 | D7 | D6 | D5 | D4 | D3 | D2 | D1 | D0 | 0 | 0 | 0 | 0 | 0 | 0 | W9 | W8 | W7 | W6 | W5 | W4 | W3 | W2 | W1 | W0 | 0 | 0 | 1 | 1 |

Fig. 8

| Address Code (6 Bits) | | | | | | | | | | | | | | | IP OP Code | | | | |
|---|---|---|---|---|---|---|---|---|---|---|---|---|---|---|---|---|---|---|---|
| 0 | 0 | 0 | 0 | 0 | 0 | 0 | 0 | 0 | 0 | G1 | G0 | I3 | I2 | I1 | I0 | 0 | 0 | 1 | 0 | 0 |

| | Uplink Message | | | | | | | STATUS | WINDOW | DECLOCK | ADDRESS / LENGTH | SYNC | |
|---|---|---|---|---|---|---|---|---|---|---|---|---|---|
| | Uplink Message Field: | | | | | | List Head WORD 0 | | | | | | |
| | WORD 1 | WORD 2 | WORD 3 | WORD 4 | WORD 5 | WORD 6 | | | | | | | |
| CRC | M0 NMP 0006 | Msg 0 Clock | Msg 0 Word 0 | Msg 0 Word 1 | Msg 0 Word 2 | M1 NMP 0000 | 0001 | 2000 | 1C | Pkt 0 Clock | 0A 07 | 4B 6F | PACKET 0 |
| CRC | Msg 1 Clock | Msg 1 Word 0 | Msg 1 Word 1 | Msg 1 Word 2 | Msg 1 Word 3 | Msg 1 Word 4 | 0000 | 0000 | 80 | Pkt 1 Clock | 0A 07 | 4B 6F | PACKET 1 |
| CRC | Msg 1 Word 5 | Msg 1 Word 6 | Msg 1 Word 7 | Msg 1 Word 8 | Msg 1 Word 9 | Msg 1 Word 10 | 0000 | 0000 | 1C | Pkt 2 Clock | 0A 07 | 4B 6F | PACKET 2 |
| CRC | Msg 1 Word 11 | Msg 1 Word 12 | M2 NMP 0000 | Msg 2 Clock | Msg 2 Word 0 | Msg 2 Word 1 | 0003 | 0000 | 80 | Pkt 3 Clock | 0A 07 | 4B 6F | PACKET 3 |
| CRC | Msg 2 Word 2 | M3 NMP 0000 | Msg 3 Clock | Msg 3 Word 0 | Msg 3 Word 1 | Msg 3 Word 2 | 0002 | 0000 | 1C | Pkt 4 Clock | 0A 07 | 4B 6F | PACKET 4 |
| CRC | M4 NMP 0005 | Msg 4 Clock | Msg 4 Word 0 | Msg 4 Word 1 | M5 NMP 0000 | CRC | 0001 | 0000 | 80 | Pkt 5 Clock | 0A 08 | 4B 6F | PACKET 5 |

Fig. 10

COMMUNICATIONS PROTOCOL FOR DIGITAL TELEMETRY SYSTEM

BACKGROUND OF THE INVENTION

1. Field of the Invention

This invention relates to a communications protocol useful in digital telemetry systems such as in well-logging applications or surface seismic measurement.

2. Background

Well-logging is the measurement of characteristics of different earth formations traversed by a borehole, usually an oil or gas well using one or more measuring instruments or tools. The tools are typically stacked in a tool string, the tool string being attached to a logging cable which supports the tool string, provides power to the tool or tools and provides a communication medium for the transmission of data from the tool or tools to data acquisition and processing equipment on the surface.

Data transmitted in a well-logging digital telemetry system are typically first transmitted over a bus within the tool string to a downhole modem. The downhole modem then uses that data to modulate a carrier signal suitable for transmission over the logging cable to the surface.

Digital communications systems require a detailed set of rules and operating procedures which enable data to be communicated effectively, namely a protocol. Communications protocols include procedures for framing, error control, sequence control, line control, and start-up control. Framing refers to the manner in which certain groups of bits are identified as either control bits or actual message bits. Error control refers to the detection of errors, acceptance and acknowledgment of correct messages, and requests for retransmission of faulty messages. Sequence control refers to the identification of messages that are retransmitted by the error control system in order to avoid loss or duplication of messages. Line control refers to the manner in which transmit/receive time windows for each transmitter or receiver are defined. That is, each transmitter or receiver in the system must know when it is to transmit or receive data. Start-up control refers to the procedure to be followed in order to start the system operating from an idle state.

Another aspect of communications protocols particularly important in well-logging applications is the manner in which messages are tagged with the depth at which the tool was located when the message was written by the tool. That may be done, in accordance with the present invention, by tagging each message with a clock value representing the time at which the message was written. Tool depth can be separately correlated with time, and it is therefore possible to calculate a tool depth for each message. Tagging each message with a clock value is referred to as time stamping.

One standard for evaluating a communications system is how much data can be transmitted over the system in a given time. The effective data rate of the system after allowance for protocol and half-duplex operation (as distinguished from the transmission rate of any individual transmitter) is the "bandwidth" of the system. An object of the present invention is to provide communications protocols that maximize the system bandwidth while at the same time minimizing the error rate by detecting and correcting those messages containing errors.

A system parameter related to bandwidth is latency. Latency is the round-trip time for uplink tool data to reach the surface and a downlink message to be received by the tool. In half-duplex communications systems, one factor influencing latency is the time required for the communications link to switch directions. Uplink bandwidth, downlink bandwidth, and latency are related. Downlink bandwidth can be increased at the expense of uplink bandwidth by allowing the system to transmit downward more of the time and vice versa. If either the uplink or the downlink transmitter does not actually use all the bandwidth allocated to it, latency will be lower than it otherwise could be.

Another parameter of digital communications systems is transmitter buffering capacity. Some communications systems use retransmission to reduce the error rate of the system. That is, when faulty data are received, the transmitter simply retransmits the data. The data must therefore be stored in buffers for some period of time by the transmitter until an acknowledgment that the data has been received without error is received. Buffering capacity, however, is expensive, and it is advantageous to minimize the buffering capacity needed to achieve a given error rate.

The ease of implementation of a particular protocol is also important. If a protocol is difficult or expensive to implement, it has little value. The best communication protocols provide the desired features with minimal overhead and cost-effective implementation.

SUMMARY OF THE INVENTION

The present invention is a communications protocol that enables communication with and between a plurality of downhole tools and the uphole central data collection point. The communication protocol sets forth the method and technique for enabling more efficient digital data transmission, especially between a plurality of downhole tools and the surface than currently available. Although the communications protocol of the present invention has a variety of applications and may be used with almost any digital communications node, for the purposes of disclosure, it will be described herein as it is implemented in well-logging applications. Specifically, the protocol of the present invention is applicable to systems that include a tool string with a tool bus providing a communications link between each of the tools in the string. Each tool is interfaced to the tool string by means of an interface package which buffers and transmits messages received from the tool. Each interface package is assigned its own address on the tool bus. The system also includes a downhole modem interfaced to the tool bus and has an associated protocol controller that buffers data received over the tool bus and retransmits the data to an uphole modem over the logging cable by digitally modulating an appropriate carrier signal. Both the logging cable and the tool bus are half-duplex communications links allowing both an uplink and a downlink transmission during any one cable or tool bus frame.

According to the present invention, messages received from each tool by its interface package (IP) are packed into uplink packets which contain both data and protocol fields. Those uplink packets are transmitted in an orderly way governed by a method referred to herein as Time Domain Multiple Access (TDMA). That method consists of preallocating a bandwidth allocation, referred to herein as the interface package transmission window, to each interface package. That bandwidth allocation is present invention also provides a delay parameter that determines when each interface package may begin transmission. Thus, the tool bus frame of the present invention consists of the following sequence.

Uplink packets are received and buffered by the downhole modem. When the tool bus frame has ended, the downhole modem transmits downlink packets over the tool bus with messages for any tools. After all queued downlink packets have been transmitted, a final downlink packet is sent which contains both a frame start command to start the next tool frame and an acknowledgment bit sequence indicating which uplink packets of the previous tool frame were received without error.

The acknowledgment bit sequence is keyed to the address of the interface package from which the uplink packet arose so that each interface package is able to determine whether its previous uplink packet was received correctly.

The protocol allows uplink messages to be of varying length by employing a linked list format. The first word of each uplink message data field in an uplink packet is a List Head which points to the first message boundary in the packet or contains a null value indicating there are no message boundaries in the packet. The first word of each message is a Next Message Pointer which points to the first word of the next message. Each message also contains a message clock value, the function of which is described below.

The uplink packets are buffered by the downhole modem before being transmitted to the uphole modem over the logging cable. The uplink packets are also stripped of their tool bus protocol, in other words the no longer needed tool bus protocol is removed from the uplink packet leaving only the uplink message data field. The uplink packets are then packed into uplink superpackets by the downhole modem. That enables the tool bus to operate independently of the cable. Thus, the half-duplex tool bus can operate with fast turn-around times and with lessened need for buffering capacity.

Each uplink superpacket contains one or more packet cores with each packet core containing data from one uplink packet. Also each superpacket contains the address of the downhole modem buffer in which the uplink superpacket was stored. At the end of the cable frame, the uphole modem transmits a downlink superpacket which contains a bit sequence keyed to the downhole modem's buffer addresses that signifies which of the uplink superpackets were received correctly during the previous cable frame. By checking the bit sequence, the downhole modem is able to determine which buffers had their uplink superpackets transmitted correctly and retransmit the superpackets if necessary. The downlink superpacket also serves as a frame start command to begin the next cable frame. That acknowledgement method is the same for the tool bus, except that in the preferred embodiment of the present invention, 32 buffers are used instead of 16. However, the benefits of this method of the present invention with respect to the tool bus also apply when that acknowledgement method is applied to the logging cable link.

The present invention also allows for time stamping each message with a system master clock value corresponding to the time the message was written by the tool to its interface package. That is done with a clock internal to each interface package which does not have to be synchronized with the system master clock within the downhole modem. As each message is received from a tool and buffered by its interface package, an IP message clock value is attached to the message signifying the state of the interface package's internal clock when the message was received. Before each uplink packet is transmitted over the tool bus by the interface package, an IP departure clock value is included as a part of each packet which signifies the state of the interface package's internal clock when the packet leaves. Thus, the absolute difference between the IP message clock value of each message and the IP departure clock value of the uplink packet containing it results in a number representing the time that the message resided in a buffer of the interface package before being transmitted. As each uplink packet is received by the downhole modem, a downhole modem arrival time value signifying the state of a system master clock is associated with each uplink packet as it arrives and later becomes part of each corresponding packet core. Thus, the uphole modem (or any other processor receiving superpackets) is able to calculate the time according to the system master clock that each message was initially written by a tool to its interface package by subtracting the absolute difference between the IP message clock value and the IP departure clock value from the downhole modem arrival time. That calculated value represents the time stamp for each message.

An object of the present invention is thus to provide a communications protocol for a well-logging digital telemetry system which allows for flexibility in the formatting of messages. Another object of the present invention is to provide a communications protocol that will permit virtually error free transmission of uplink and downlink data in the presence of link errors. Another object is to provide a communications protocol that can operate effectively on half duplex links without spurious synchronization pattern detections. Another object is to provide a communications protocol which allows for absolute and relative time stamping. Another object is to provide a communications protocol which permits orderly allocation of bandwidth to tools in a manner suitable for real-time data acquisition. Still another object is to provide a communications protocol with a minimum of protocol overhead in a manner suitable for efficient hardware implementation with or without a computer processor, so that processors may be eliminated from those subsections where processor-based implementations are not feasible or cost-effective.

Other objects, features and advantages of the invention will become evident in light of the following detailed description considered in conjunction with the referenced drawings of a preferred exemplary embodiment according to the present invention.

BRIEF DESCRIPTION OF THE DRAWINGS

FIG. 7 illustrates the downlink packet data field defining a Set Window and Delay Command.

FIG. 8 illustrates the downlink packet data field defining a Set IP Address Command.

FIG. 10 is a graphic illustration of an example of a series of uplink messages.

DETAILED DESCRIPTION OF THE INVENTION

Figure 1:
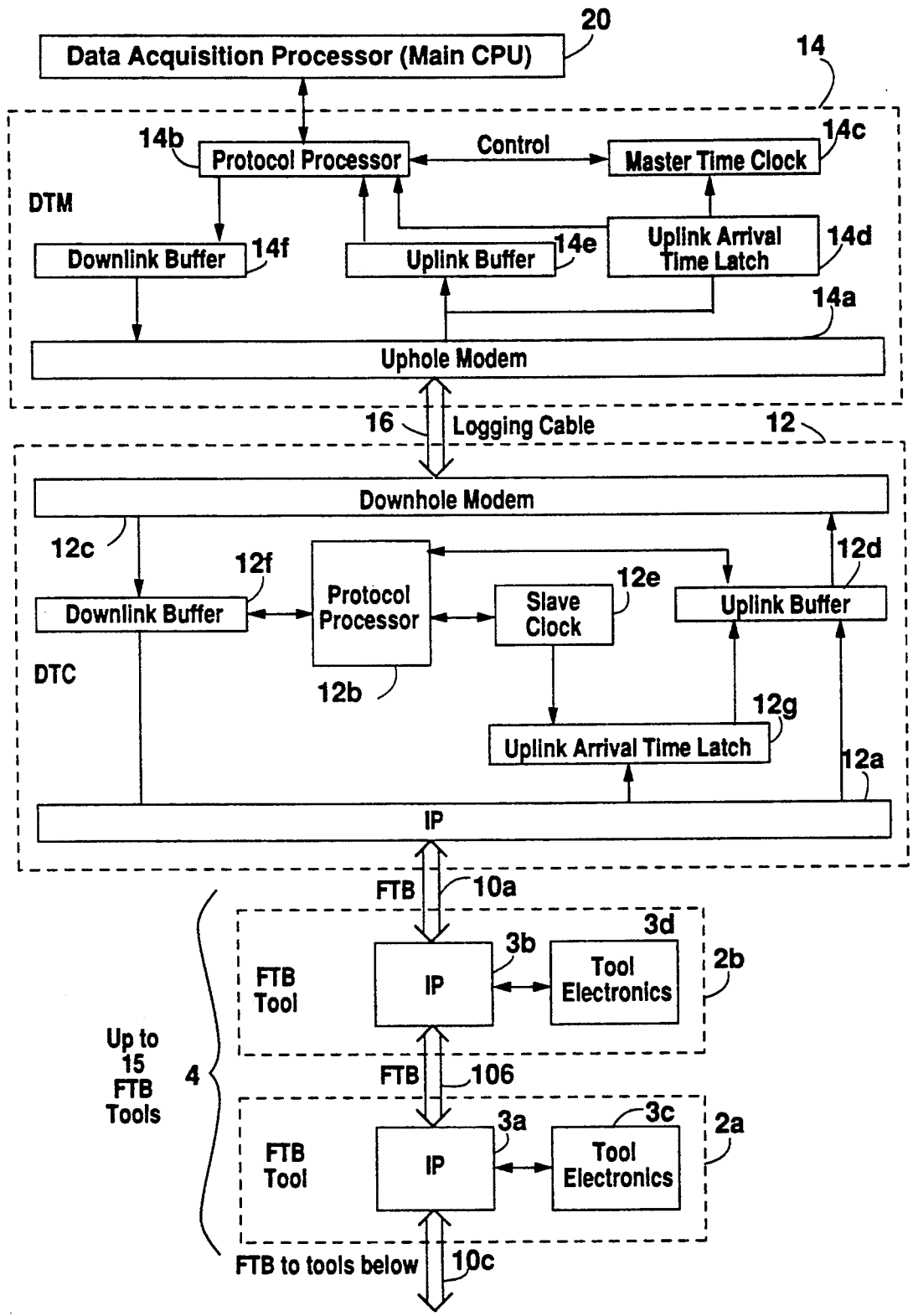
FIG. 1 illustrates a hardware implementation of the protocol of the preferred embodiment of the present invention.

The following is a description of a particular embodiment of the present invention. Referring to FIG. 1, the basic hardware implementation of the protocol will be discussed. Each downhole tool 2a, 2b in tool string 4 includes at least one interface package (IP) 3a, 3b which provides the tool with a digital port consisting of a byte-wide (8 bits) parallel bus, read/write strobes, and handshake lines. Although only two tools are shown in the drawings, a number of tools may be joined in a tool string as described above. Messages written to that port by the tool are transmitted up the system to the data acquisition CPU 20. Downlink messages may also be transmitted to a tool 2a, 2b from CPU 20 via its IP 3a, 3b. The system is half-duplex in that only uplink or downlink messages are transmitted at any one time.

Command messages are originated in CPU 20 and are transmitted to Digital Telemetry Module (DTM) 14. DTM 14 examines the commands with Protocol Processor 14b and formats downlink packets with all messages except those intended for DTM 14. All downlink packets originated since the last downlink transmission are packed into the a superpacket in Downlink Buffer 14f. The superpacket in Downlink Buffer 14f is presented to Uphole Modem 14a for modulation and transmission via Logging Cable 16 to Digital Telemetry Cartridge (DTC) 12 Downhole Modem 12c demodulates and frames the superpacket. The framing operation will be discussed herein. If the framing operation shows that the superpacket was received correctly, an uplink transmission is initiated by DTC 12 on Logging Cable 16. If DTM 14 does not detect the uplink transmission by a predetermined time (20 milliseconds in the preferred embodiment), DTM 14 assumes that the last downlink superpacket was received in error and will immediately retransmit the last downlink superpacket. That process will continue for up to six attempts, after which time DTM 14 notifies CPU 20 of the problem provided that the downlink superpacket still has not been received correctly. CPU 20 will then reinitialize the link and notify the system operator.

However, once the downlink superpacket has been received correctly by DTC 12, the data is written to Downlink Buffer 12f. Downlink Buffer 12f presents the data to DTC Interface Package (IP) 12a at the next Fast Tool Bus (FTB) 10a downlink cycle. FTB 10a–c are half-duplex buses which switch between uplink and downlink transmission direction (8 milliseconds in the preferred embodiment). Downlink Buffer 12f writes the data to DTC IP 12a in the form of packets with each packet being written twice with a short dead time between packets to guard against noise bursts. That reduces the effective FTB downlink error rate to the square of the packet error rate. In the preferred embodiment, the FTB has a $10^{-6}$ packet error rate so that the effective FTB error rate is $10^{-12}$. Even the few remaining errors can be corrected by retransmissions initiated by CPU 20; however, that delays the receipt of the data by the intended tool, which can have undesirable effects. Thus, the present scheme sacrifices half of the available FTB downlink to ensure that only one downlink packet in one trillion (1,000,000,000,000) has an additional downlink latency due to retransmission.

DTC IP 12a sends the data down FTB 10a to IP 3b of Tool 2b. IP 3b stores any data intended for Tool 2b and repeats the data to Tool 2a below. That process is repeated by each tool IP, up to a maximum of 16 IPs. A detailed description of IP operation is contained herein.

Figure 6:
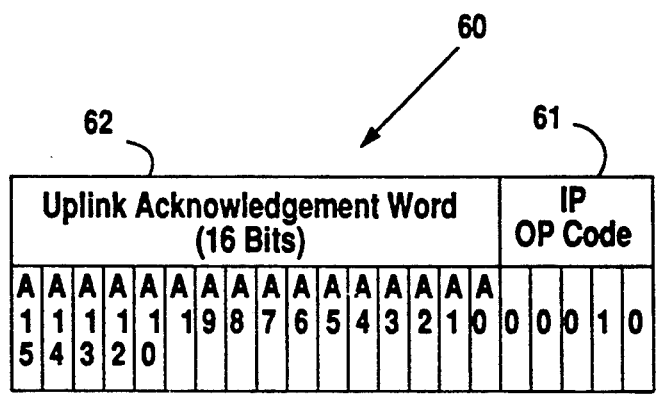
FIG. 6 illustrates the downlink packet data field a Frame Start Command.

Downlink data are transmitted on the selected FTB until the predetermined period has expired (8 milliseconds in the preferred embodiment). Then DTC Protocol Processor 12b initiates a Frame Start Downlink Packet (See FIG. 6). That packet has the universal address and is accepted by all the tools. As each IP accepts the Frame Start packet, it changes orientation to the uplink direction. Each IP examines one bit of the Acknowledge Word (See FIG. 6) in the Frame Start Packet to determine if the next uplink transmission should be a repeat of the last uplink packet. The IP address is used as a bit index into this word, so that each IP up to the limit of 16 has a particular bit of the Acknowledge Word associated with that IP. DTC Protocol Processor 12b formats the Acknowledge Word based on which FTB uplink packets were received correctly on the last uplink transmission. Thus, if DTC 12 receives a packet from a particular IP correctly, the corresponding bit of the Acknowledge Word will be set. Each IP will examine its particular Acknowledge Word bit, and if it is set, the next uplink transmission will be a new packet; otherwise, the previous packet will be repeated.

The FTB channel bandwidth is allocated using time domain multiple access. Each IP has a delay register and a window register which controls access to the uplink channel. After a Frame Start Packet is received, each IP is oriented in the uplink direction and is repeating data from the tool below. After the number of words indicated by the IP delay register (See FIG. 7) has elapsed, the IP stops repeating the data from the tool below and begins transmitting its own package. The maximum length of that packet is dictated by the window register, which effectively allocates the bandwidth available to that particular tool. For example, if the window register is set to 10 words, then the selected IP can transmit at most 10 words of data per FTB transmission. Since there are 62.5 uplink transmissions per second, the selected tool has a bandwidth allocation of 625 words per second. Each IP is programmed by commands from the CPU 20 with an appropriate window and delay value. The delay for the bottom IP is always one word which allows transients on the link associated with the change in direction to disappear. The bottom IP then transmits up to its window allocation and turns around to begin repeating data in the downlink direction. The next IP has its delay set so that the maximum length packet from the tool below has time to clear its repeater, then transmits its packet. Afterwards, it begins repeating downlink data. Each IP from the bottom to the top transmits in turn. After the top IP (which is always in DTC 12) finishes transmitting, it turns to the downlink direction. At this point, all IPs are oriented in the downlink direction, and Downlink Buffer 12f in DTC 12 is permitted to initiate further downlink transmission, completing one full frame. In the preferred embodiment 8 milliseconds are allocated for transmission in each direction, for a total of 16 milliseconds per frame, which leads to an FTB frame rate of 62.5 Hz. That frame rate is fixed, even if the full allocation in a particular direction is not used. For example, if only 6 milliseconds are needed to transmit all available downlink data, the downlink would simply remain idle for the next 2 milliseconds until the full 8 millisecond allocation has expired. Then, the Frame Start is sent.

As each uplink packet is repeated by DTC IP 12a, those with a correct CRC Word (See FIG. 3) are stamped with the DTC Uplink Arrival Time Latch 12g and placed in the Uplink Buffer 12d. DTC Protocol Processor 12b is notified of each uplink packet received correctly so that it can properly format the Acknowledgement Word. All packets received in a particular uplink FTB frame are packed into a single superpacket in Uplink Buffer 12d where an additional superpacket protocol is added by DTC Protocol Processor 12b. After a downlink superpacket has been received correctly, all superpackets in Uplink Buffer 12d are transmitted by Downhole Modem 12c via the Logging Cable 16 to Uphole Modem 14a. In the preferred embodiment, a maximum of up to 200 milliseconds of uplink transmission time is allowed. If any uplink superpackets have not been transmitted after 200 milliseconds, they are held until the next uplink transmission period. Uphole Modem 14a demodulates and frames each uplink superpacket. Each uplink superpacket transmitted correctly is stamped by DTM Uplink Arrival Time Latch 14d placed in DTM Uplink Buffer 14e. DTM Protocol Processor 14b parses the superpacket protocol to extract the IP packets and then parses the IP packets to assemble the tool messages which are passed to CPU 20. Details of the packet and superpacket protocols are discussed herein.

For the purpose of disclosure with regard to the system hardware, there were two separate links described. Namely, the Logging Cable link and the FTB link. However, one skilled in the art will readily recognize that although these links are designed to complement one another, they need not be used together because each has its own separate framing, time stamping and retransmission protocol. For example, the FTB protocol could be used all the way up to DTM 14, with DTM 14 controlling FTB transmissions or similarly, the Logging Cable link could be used with a different tool bus protocol altogether.

INTERFACE PACKAGE

Figure 17:
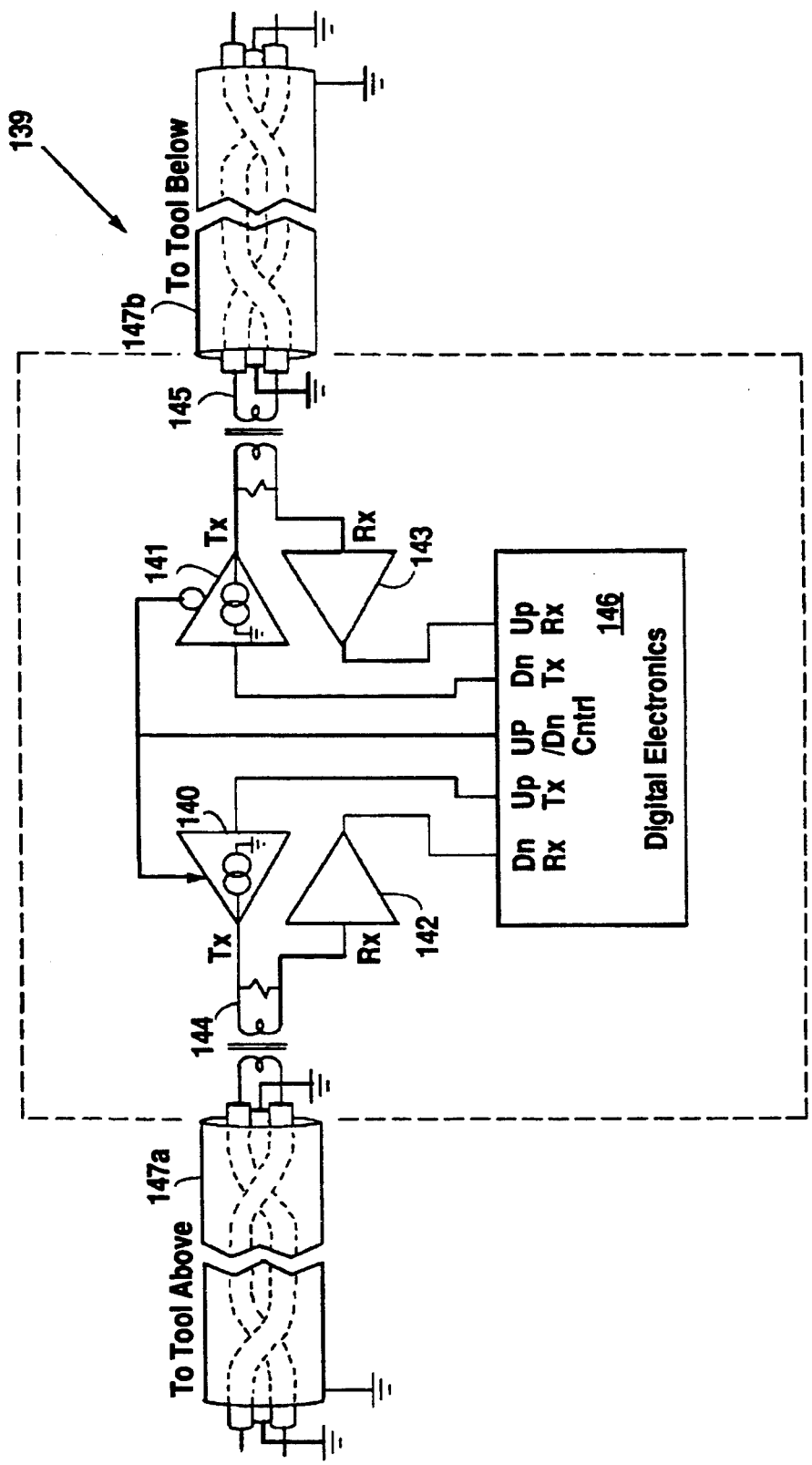
FIG. 17 illustrates a hardware implementation of the interface package of the preferred embodiment of the present invention.
Figure 18:
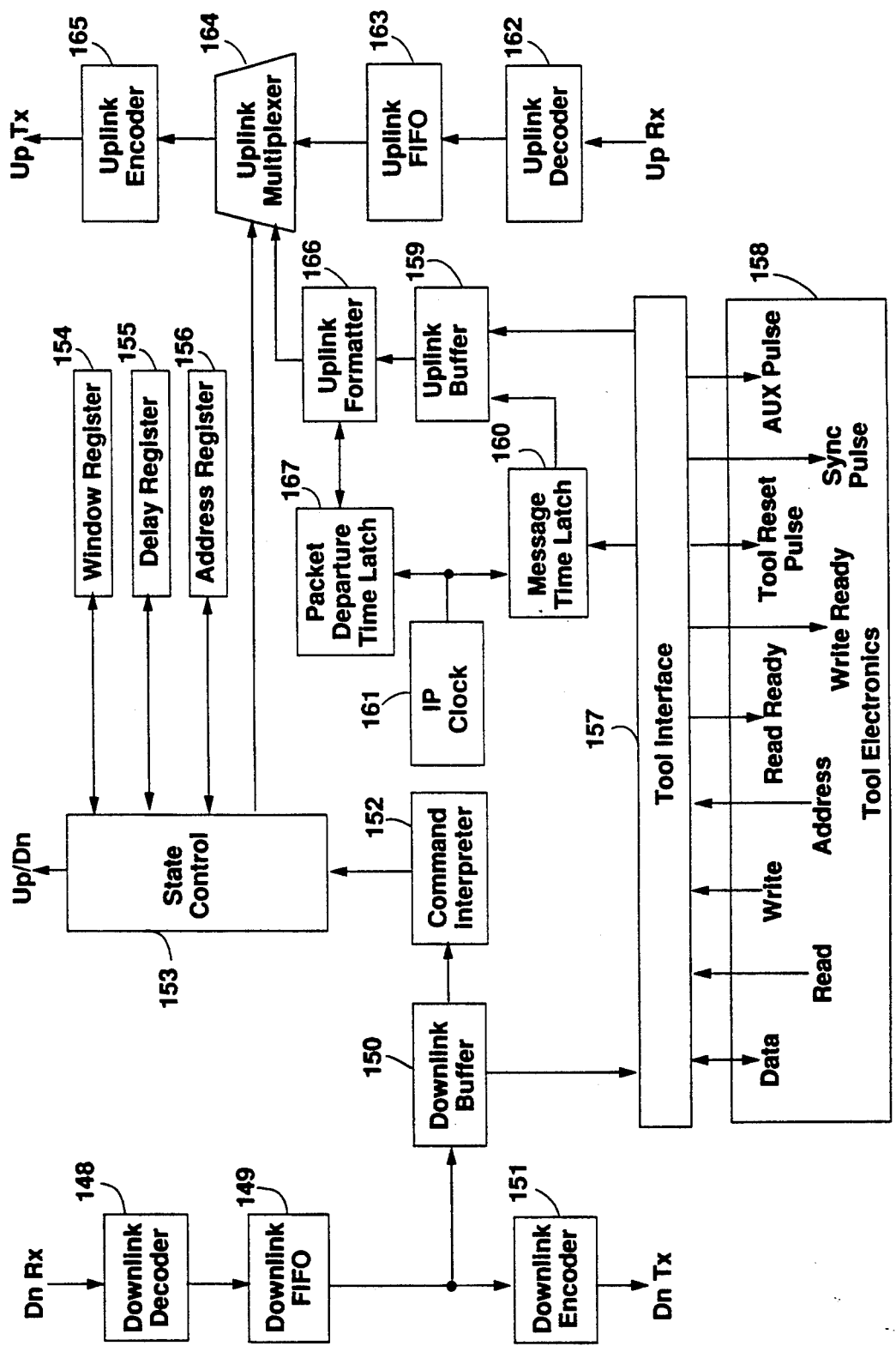
FIG. 18 illustrates a digital electronics implementation of the interface package of the preferred embodiment of the present invention.

Referring to FIGS. 17 and 18, Interface Package (IP) 139 which implements the Fast Tool Bus (FTB) protocol for each tool will be discussed.

FIG. 17 illustrates the analog interface to IP 139. That interface consists of two drivers 140, 141 and two receivers 142, 143 which are coupled with Transformers 144, 145 to an FTB cable 147a, 147b. The receivers and transmitters are controlled by the Up/Dn signal from Digital Electronics 146. When that signal is asserted, Transmitter 140 and Receiver 143 are enabled. That allows data to be received from the tool below and transmitted to the tool above. When Up/Dn is deasserted Transmitter 141 and Receiver 142 are enabled. That allows data received from the tool above to be transmitted to the tool below. Receivers 142, 143 convert the differential analog inputs from the FTB cable to standard logic levels which are fed to the Digital Electronics 146. Transmitters 140, 141 convert the logic inputs to analog differential signals which are driven onto the FTB.

FIG. 18 illustrates Digital Electronics 146 of IP 139. The DnRx signal is fed to Downlink Decoder 148 which demodulates and frames the input signal. The recovered data is sent to Downlink FIFO 149, which compensates for the differences between the transmitted clock rate and the IP clock rate. The output is then sent to Downlink Buffer 150 if the packed address matches the IP address. Regardless, the output is also sent to Downlink Encoder 151, where it is reformatted back into a packet and modulated to form the DnTx signal. Thus Downlink Decoder 148, Downlink FIFO 149 and Downlink Encoder 151 form a full digital repeater which fully decodes and regenerates the downlink signal in IP 139. That prevents noise and timing skews from accumulating along the FTB bus, thereby, ensuring more reliable system operation.

Downlink Buffer 150 stores messages that were addressed to IP 139. If the messages are commands to IP 139, they are forwarded to the Command Interpreter 152, which determines the message type and activates State Control 153 in response. Messages which adjust the IP window, delay, or address are decoded and the new values are stored in the Window Register 154, Delay Register 155, or Address Register 156, respectively. Other commands which change the state of State Control 153, such as providing for the ability to disable the repeaters, internally looping back the digital data, or intentionally causing a CRC error on the data outputs are also stored.

Disabling the repeaters is critical for initial address setup of each IP. To initially set the addresses of each IP, all repeaters are enabled with universal commands accepted by all IPs. In the preferred embodiment, the addresses of all IPs are first set to 15 by a universal command. Next, all repeaters are disabled by a universal command so that only the top IP can receive commands. In addition, a command to address 15 is sent which sets the ID of that IP to 0. Then, an Enable Repeaters command is sent to address 0 followed by a command to address 15 which sets the ID of that IP to 1. At this point, the top two IPs receive that command; however, the top IP has address 0 and ignores the command so that the ID of the second IP is set to 1. Next, an Enable Repeaters command is sent to ID 1, which enables the third IP to receive commands. That process is repeated until each of the IPs is assigned a unique address from 0 to 15. Subsequent setup commands such as window and delay are then addressed to each IP with its unique ID.

A Loopback mode is used for test purposes. When set, the selected IP takes all tool messages on the downlink and sends them back on the uplink. That verifies communication to each IP, isolating any failure to a single link in the event of a problem. The Force CRC command (See FIG. 16) is also used for test purposes allowing verification of the CRC check in the Uplink Decoder (See FIG. 18) of each IP.

The most common IP command is the Frame Start command (See FIG. 7) which occurs at the end of each downlink transmission period. That command asserts the Up/Dn signal (See FIG. 18) and begins the uplink transmission process.

If the messages in Downlink Buffer 150 are commands to the tool, they are sent to Tool Interface 157, which provides the interface to the Tool Electronics 158. In the preferred embodiment, three types of commands send 6.4 microsecond digital pulses to the tool. The Tool Reset command activates the Tool Reset Pulse which is intended to reset the Tool Electronics 158. The Synchronization command activates the Sync Pulse, which is intended for time synchronization between tools and surface events. The Aux Pulse command activates the Aux Pulse. The specific purpose of this pulse is left to the tool to define, allowing some flexibility. One anticipated use for this pulse is to provide depth information to the tool.

The most common tool command is the Tool Message Command (See FIG. 5), which, in the preferred embodiment, provides a message of up to 8 words to the tool. The protocol of that message is left completely up to the tool. When a Tool Message has been received for the tool, the Read Ready signal becomes asserted. Tool Electronics 158 reads the message by asserting the Read signal and latching the data on the Data output from Tool Interface 157. When all of the data in a message have been read, the Read Ready signal is deasserted.

Data are written to Tool Interface 157 in a similar manner. The data to be written is presented on the Data lines when the Write signal is asserted. Tool Interface 157 then stores that data in Uplink Buffer 159. After all of the data in a message are written, the Address signal is asserted and a final write is performed. That writes an End Of Message (EOM) marker which is used to separate the data into individual messages at the surface. When the first word of a new message is written, Message Time Latch 160 stores the current value of the IP Clock 161 in Uplink Buffer 159. That time value is used at the surface to calculate the system message time stamp.

When a Frame Start command occurs, the uplink transmission process begins. Initially, each IP repeats the data on the UpRx input where Uplink Decoder 162 demodulates and frames UpRx and stores the data in Uplink FIFO 163. Uplink FIFO 163 compensates for differences between the received clock and the IP clock. The data are read from Uplink FIFO 163 by the Uplink Multiplexer 164, which presents the data to Uplink Encoder 165. Uplink Encoder 165 provides the packet protocol and modulates the data which is transmitted on UpTx. Uplink Encoder 165 provides a digital repeater function exactly like the downlink.

Once the delay specified by Delay Register 155 has expired, Uplink Multiplexer 164 stops reading Uplink FIFO 163, which terminates the repeater function. At this point, Uplink Formatter 166 reads data from Uplink Buffer 159 and forms it into a packet. The maximum length of that packet is specified by Window Register 154 (See FIG. 7). The packet is then stamped with a departure time which is generated by IP Clock 161 and latched into Packet Departure Time Latch 167. The time-stamped packet is sent to Uplink Multiplexer 164, which sends it to Uplink Encoder 165. Uplink Encoder 165 adds the required packet protocol and modulates the data to obtain the output signal UpTx.

After the complete uplink packet from IP 139 has been transmitted, the State Control 153 deasserts Up/Dn, and waits for further downlink commands.

FRAMING

Figure 19:
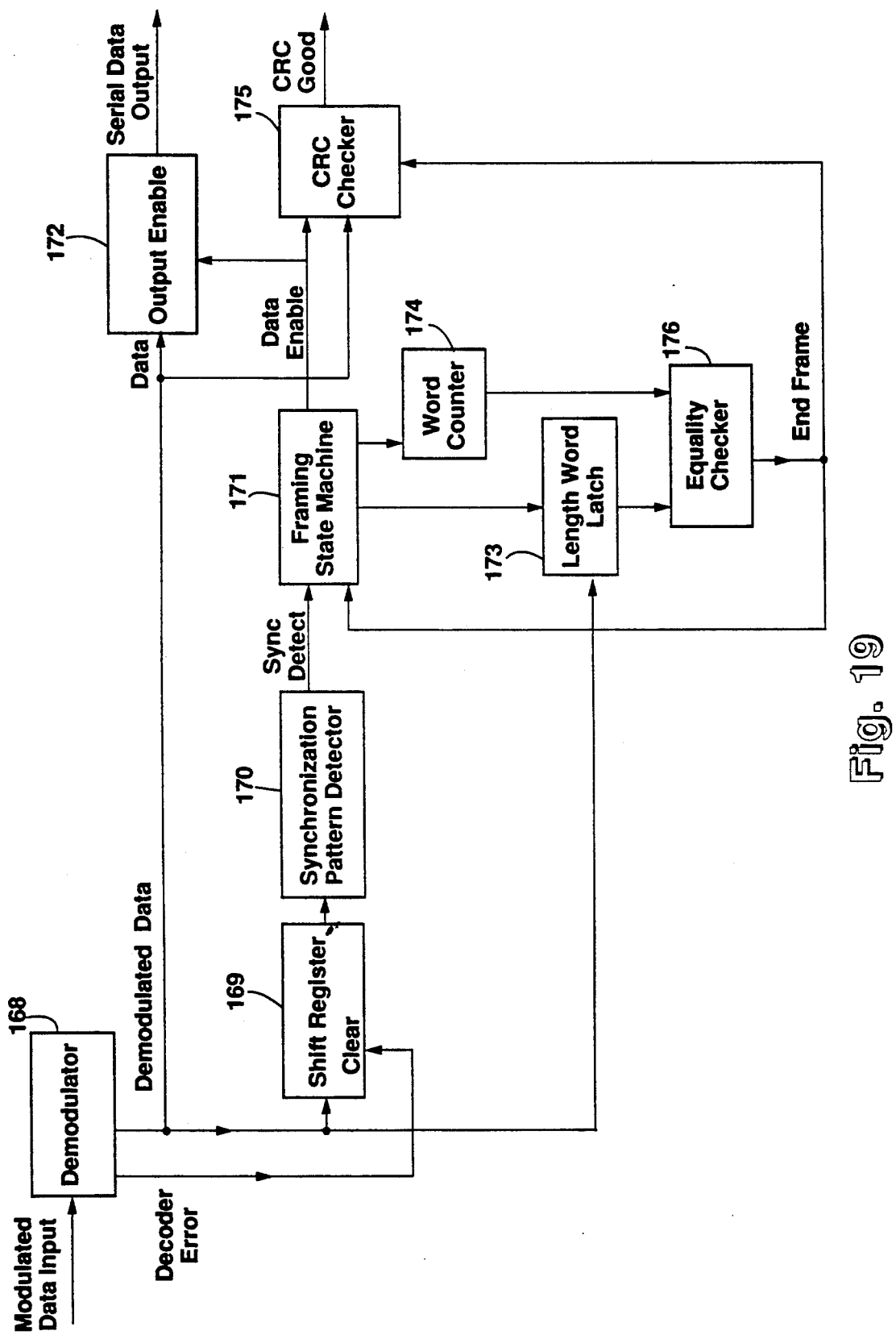
FIG. 19 illustrates a hardware implementation of the framing operation of the preferred embodiment of the present invention.

Referring to FIG. 19, the framing operation for any uplink or downlink packet or superpacket will be discussed. That operation consists of detecting the synchronization pattern, reading the packet length word, counting the packet length and verifying correct CRC for the entire packet except the synchronization pattern.

Demodulator 168 demodulates the Modulated Data Input and produces a Demodulated Data output and a Decoder Error signal. That Decoder Error signal is asserted whenever Demodulator 168 detects excessive noise on the link. In addition, that signal is used to clear Shift Register 169 to avoid spurious synchronization detection on spurious data. That is critical to operation on half duplex links where the Modulation Data will consist of only noise and crosstalk when the link is operational in the other direction. Otherwise, random triggering of Synchronization Pattern Detector 170 for a 16-bit synchronization pattern would occur once every $2^{16}$ bits, resulting in frequent data loss. Since there is only a 10% chance that a given bit produced by random noise would not trigger a Decoder Error, the probability of the spurious synchronization with this scheme is only $10^{16}$, thus reducing the error rate to the point where the retransmission mechanism can easily recover the lost data.

Synchronization Pattern Detector 170 starts Framing State Machine 171, which asserts Output Enable 172, enables Length Word Latch 173, clears Word Counter 174 and enables the CRC Checker 175. Subsequently, intput data is shifted into CRC Checker 175 until the entire packet (except the synchronization word) has been stored.

Each input word subsequent to the synchronization pattern increments the Word Counter 174 until the Equality Checker 176 determines that the word count has reached the length word, indicating that the full packet has been received. Equality Checker 176 then asserts the End Frame signal, which latches CRC Checker 175 and turns off Framing State Machine 171, which in turn disables Output Enable 172. A 0 value in CRC Checker 175 indicates that the data was received correctly. Any other value indicates that one or more bits were received in error.

Output Enable 172 generates the framed, demodulated data which is buffered until the complete packet has been received. After the complete packet has been received, if CRC Checker 175 indicates the data are good, then it is acted upon. Otherwise, the data are discarded.

The remaining detailed description of the preferred embodiment of the present invention will deal with the communications protocol in general and that portion of the protocol which enables the system to perform time stamping.

In well-logging applications, data gathered by a tool 2a, 2b must be correlated to the specific depth the tool was at when the data was gathered. That is done in the present invention by stamping the data with a particular time value which can then later be matched with a tool depth corresponding to that time value. The presently described embodiment allows for two types of time stamping, automatic and tool event. In automatic time stamping, each message from a tool is stamped with a time corresponding to the value of the master time clock in DTM 14 when the message was written by the tool. The method for accomplishing that stamping is set forth in detail further below. In tool event time stamping, tool 2a, 2b uses its own internal clock to stamp messages. The internal clock is synchronized to the DTM master time clock. The choice of which of the two time-stamping methods to be used by a particular tool is made in the preferred embodiment of the present invention by a pin in each IP 3a, 3b designated herein EIPC (for external IP clock).

In the following discussions, the LSB (least significant bit) of any group is always the rightmost bit and is always transmitted first. Any reference to a "word" herein refers to a collection of 16 contiguous related bits.

FTB PROTOCOL (IP TO DTC)

The link protocol in this section refers to the transmission of data to and from each IP 3a, 3b to DTC 12. That transmission is on Fast Tool Bus or FTB 10 (the tool bus connecting the tools of the tool string and the DTC).

FTB 10, in the preferred embodiment of the present invention, is a single twin coaxial cable which interconnects the IPs. Adjacent segments of the bus are isolated from one another using transformers and repeater circuitry (See FIG. 17) in each IP 3a, 3b. Chassis isolation of FTB 10 is inherently provided by those transformers and a balanced configuration of cable drivers and receivers (See FIG. 17). The FTB, in the preferred embodiment, operates at 2.5 megabits per second in both directions. Because there is only one signal path, operation is half duplex; i.e., data can be transmitted in only one direction (up or down) at a time. "Biphase mark" modulation is used to create a self-clocking waveform, since the single signal path will not support separate clock and data signals.

An IP's access to FTB 10 is controlled by a form of Time Domain Multiple Access (TDMA). Each IP 3a, 3b in the downhole tool string is allocated a transmission window of programmed length starting a programmed delay after it receives a Frame Start Command 60 (FIG. 6) from the Digital Telemetry Cartridge (DTC) 12. That order of transmission is bottom tool first, then sequentially up the string.

Each IP 3a, 3b can be in one of two transmission modes: UP or DOWN. In the DOWN mode, the IP listens for and repeats downward packets, unable to transmit data upward. Shortly after a Frame Start command 60 (FIG. 6) is received, all IPs switch UP, and wait for their transmission windows to open. During that waiting period, each IP 3a, 3b repeats uplink packets from all tools below, which are transmitting in sequence, starting with the bottom tool. When its window opens, each IP 3a, 3b transmits its packet, then switches to the DOWN mode. The cycle of a Frame Start command 60, followed by an uplink packet from every IP, followed by a period of downlink transmissions constitutes an FTB "frame." One aspect of using Time Domain Multiple Access (TDMA) on a half duplex link is that spurious synchronization pattern detection is likely while the link is inactive. At least one link (uplink, downlink or both) will always be inactive, and random patterns will be present on the inactive link. There is a 50% chance that each random bit will match the appropriate bit of the synchronization pattern, leading to a probability of $\frac{1}{2}^{16}$ or 1/65536 that the next input bit will cause a synchronization pattern detection. That spurious detection will cause frequent loss of data, because the link must handle the spuriously detected packet (the link does not know whether the data is real or not), and may still be processing the spuriously triggered packet when the real packet is received.

Referring to FIG. 19, to avoid spurious synchronization pattern detection, each receiver decoder in the preferred embodiment of the present invention is provided with the capability of detecting received symbols with distortion exceeding a certain level; if the threshold is exceeded, the decoder asserts the decoder error output. That output is used to reset the synchronization pattern detector. Thus, the entire 16 bit pattern must be received without a decoder error to achieve a synchronization pattern detection. There is only a 10% chance that each random bit will match the appropriate bit of the synchronization pattern and not trigger a decoder error. That leads to a probability of $1/10^{16}$ that the next input bit will cause a synchronization pattern detection. At a link rate of 2.5 Mb/sec, that will occur only once per 1000 hours, on average. Thus, the present invention solves a key problem associated with TDMA on half duplex links.

With regard to the FTB framing protocol, certain fields are necessary for proper framing and validation of packets. That is the minimum data required to repeat packets and detect packets intended for a particular address. All packet data are passed to the transport protocol for interpretation.

(a) Downlink Packet Format

Figure 2:
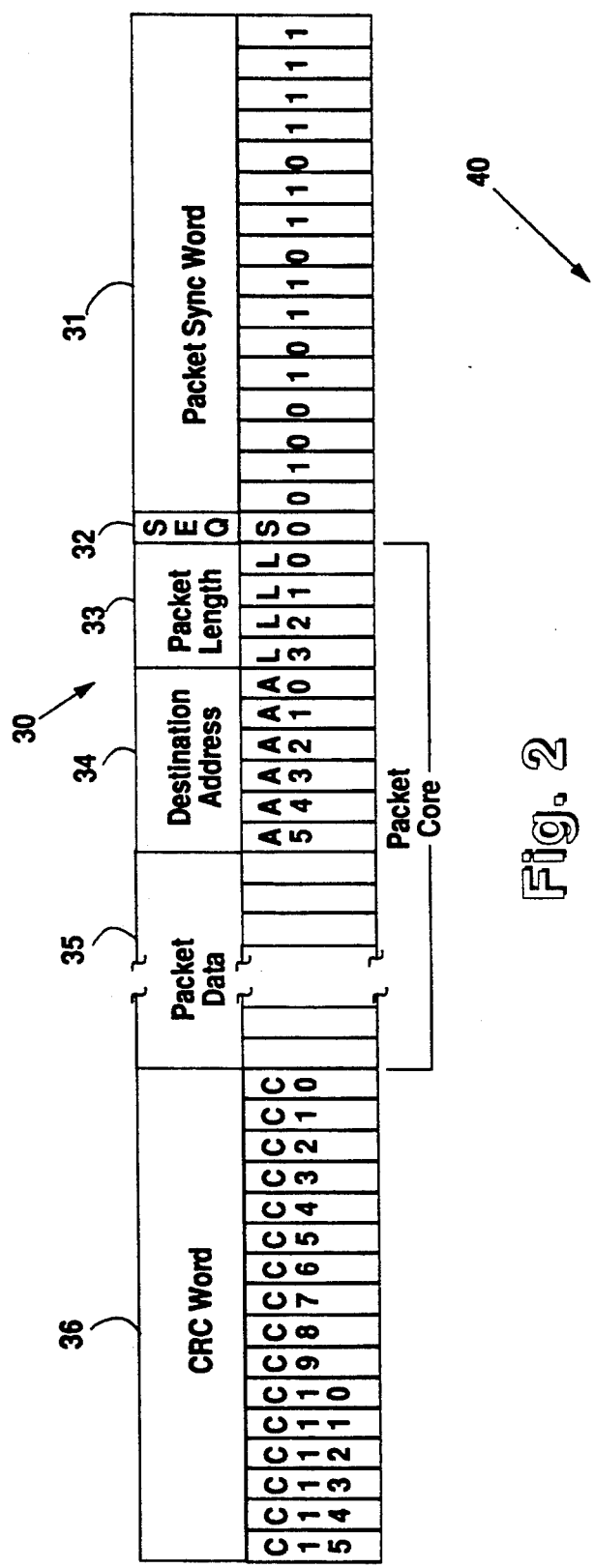
FIG. 2 illustrates the fields of a downlink packet.

The FTB downlink format is expressed in the collection of fields shown in FIG. 2, which are collectively referred to as "Downlink Packet" 30. Downlink packets, in the preferred embodiment of the present invention, may be 3 to 11 words in length.

"Packet Sync Word" 31 is used to identify the start of each packet. For example, in one particular embodiment, this word is the bit stream 0100101101101111. Whenever the term "sync word" is used herein without any other description, it refers to the Packet Sync Word.

Sequence Bit ("SEQ") 32 determines whether the packet is a retransmission of a previous packet. If the Sequence Bit is 0, the packet is new. If it is a 1, the packet is a retransmission. If the packet is a retransmission and the previous packet was accepted, then it is ignored; otherwise the packet is accepted. The packet will be acknowledged unless both transmissions are in error.

Downlink Packet Length ("Packet Length") 3 (four bits in the preferred embodiment) determines how many words of downlink packet data will follow. A value of 0 indicates that the CRC (Cyclic Redundancy Check) Word 36 follows directly after five bits of downlink packet data. The maximum value of this field in the preferred embodiment is 8. That indicates that there are five bits plus eight words of downlink packet data for a total of 134 bits.

"Destination Address" 34 (six bits in the preferred embodiment) is used to indicate which IP(s) should accept the packet. The most significant two bits of the address field indicate the address type as listed in Table 1 below. The least significant bits are the "Index Code" or "Group Code," depending on the address type. If the address is of the type "No Operation," no IP will accept this packet. If the address is an "Index Address", only the IP with a matching Index Code (the least significant four bits of the address) will accept the packet. If the address is "Group Address," all IPs which have this Group Code (the least significant two bits of the address) will accept the packet. Finally, if the address is a "Universal Address," all IPs will accept this packet. The two-bit Group Code allows for up to four groups, and the four-bit Index Code allows for up to 16 IPs.

TABLE 1

IP Destination Address
Interpretation of Address Field

| MSB Address | Address Type | LSB Address |
| --- | --- | --- |
| 00 | No operation | Ignored |
| 01 | Index Address | Index Code |
| 10 | Group Address | Group Code |
| 11 | Universal Address | Ignored |

From 0 to 8 data words plus five bits, in the preferred embodiment, may be placed in the Downlink Packet Data ("Packet Data") 35. The five bits are used to identify the packet type.

A 16-bit CRC Word is computed from the value of all of the data in the packet with the exception of the sync word. This computation is based on the polynomial $X^{16}+X^{12}+X^5+1$. If the CRC is incorrect, a status bit is set and the packet is ignored. Otherwise, the packet is interpreted by the transport protocol if the destination address matches.

(b) Uplink Packet Format

Figure 3:
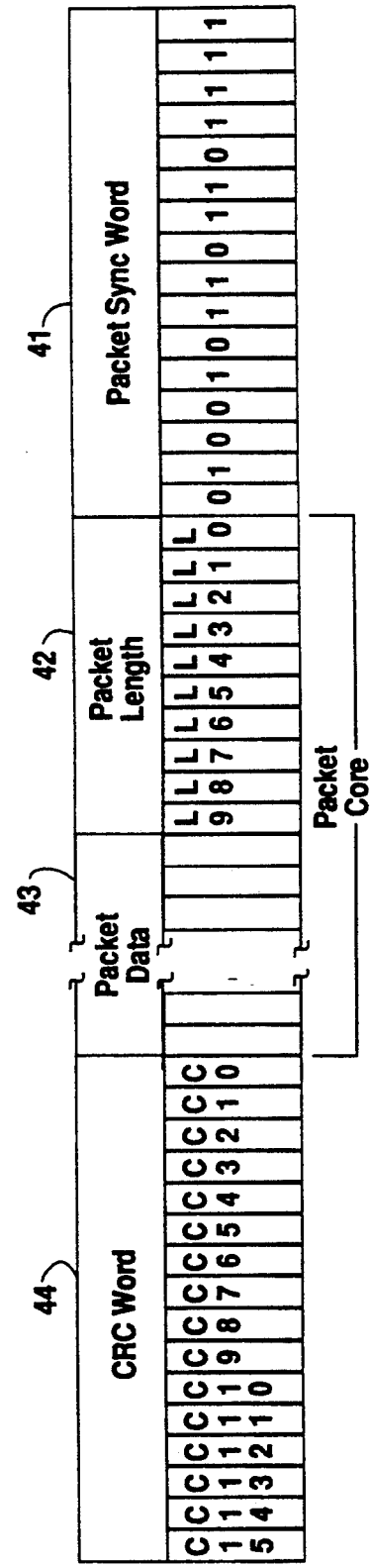
FIG. 3 illustrates the fields of an uplink packet.

The FTB uplink format is expressed in the collection of fields shown in FIG. 3, which are collectively referred to as "Uplink Packet" 40. Uplink packets, in the preferred embodiment of the present invention, may be six to 1025 words in length.

"Packet Sync Word" 41 (16 bits in the preferred embodiment) is used to identify the start of each Packet. Uplink Packet Length ("Packet Length) 42 (ten bits in the preferred embodiment) determines how many words of uplink packet data will follow. A value of 0 indicates that the CRC Word 44 follows after 54 bits of uplink packet data. The maximum value of this field in the preferred embodiment is 1019. That would indicate 54 bits plus 1019 words of uplink packet data.

From 0 to 1019 data words plus 54 bits may be placed in the Uplink Packet Data ("Packet Data") field 43. The 54 bits contain the current IP operating mode and status, and are discussed further below.

Finally, a 16-bit CRC Word is computed from the value of all of the data in the packet with the exception of the sync word. That computation is based on the polynomial $X^{16}+X^{12}+X^5+1$.

TRANSPORT PROTOCOL

The transport protocol are the operations and status associated with configuring a network of up to 16 IPs, one of which is in DTC 12. It also involves some protocol and status relating to retransmission of packets, time synchronization, and link health monitoring.

In the preferred embodiment, zero or more packets are sent on the downlink to each IP 3a, 3b in tool string 4. Each downlink packet is sent twice, with 48 bits of zeros between the original packet and the retransmission as a precaution against burst errors corrupting both packets. The first packet is marked by a sequence number of 0 and the retransmission is indicated by a sequence number of 1. An IP accepting a packet with a sequence number of 0 will wait until there has been sufficient time for the packet to be retransmitted before implementing any instructions contained in the message of the downlink packet. That allows for tighter synchronization of downlink packets in the event of link errors.

When there are no further downlink packets to be sent, a downlink packet that contains the Frame Start Command 60 (FIG. 6) and the universal address is issued. That packet is accepted by all IPs to begin the uplink transmission. The Uplink Acknowledgment Word 62 (16 bits in the preferred embodiment) of the Frame Start Command 60 is examined by each IP to determine if that IP should send new data or should retransmit the previous packet. The particular bit of the Acknowledgment Word 62 examined is based on the ID of a given IP, with IP 0 using bit 0, IP 1 using bit 1, and so forth. If that particular bit is 0, the previous packet is transmitted; otherwise, a new packet is transmitted. That method allows up to 16 IPs to receive acknowledgments with only 16 bits of data; furthermore, that method of checking the bit field for the particular acknowledgement results in substantial hardware savings. Conventional methods have code acknowledgments using packet ID numbers, which typically have 400%-1600% more overhead depending upon the precise choice of packet ID number used, and need a computer processor or elaborate hardware for the generation and decoding of such acknowledgments.

The IPs each transmit one packet on the uplink using Time Domain Multiple Access (TDMA) at the packet level, beginning with the bottom IP and proceeding in order to the top IP (the DTC 12). After each IP sends an uplink packet, it then waits for further downlink packets. That protocol allows half duplex transmission on the FTB and embedded acknowledgement for error-free transmission on the uplink.

If link errors on the downlink cause an IP to miss the Frame Start command 60, that IP will not transmit on the uplink and packets from all IPs below are not repeated. However, the retransmission mechanism will prevent data from being lost in that instance.

(a) Downlink Packet Data Format

Figure 4:
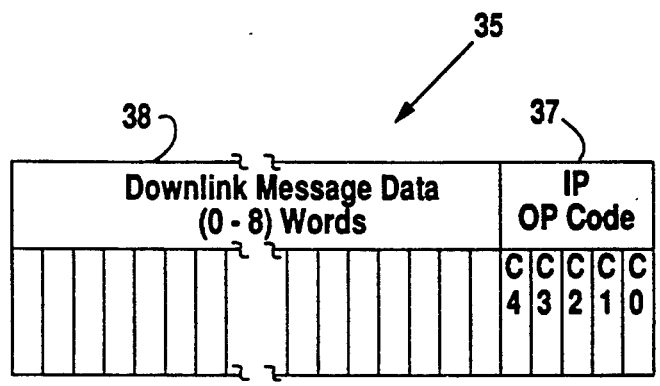
FIG. 4 is a detailed illustration of the downlink packet data field.

The transport protocol defines the actions that each IP 3a, 3b will take based on the downlink "Packet Data" field 35. The "Downlink Packet Data" field 35 of the preferred embodiment is shown in detail in FIG. 4 in the framing protocol as a field of five bits plus zero to eight words. For transport, that format is divided into two fields as shown in FIG. 4: the Downlink operation code ("IP OP Code") 37 and optional "Downlink Message Data" 38.

The "IP OP Code" 37 (five bits in the preferred embodiment) is used to initiate various actions in the IP. Those actions are listed in the IP Op Code Table (Table 2 below) based on bits C3, C2, C1, and C0. An "X" in the Op Code Table indicates that the state of the bit is unimportant. The IP of the current embodiment does not decode bit C4 of the op code, and expects that bit to be 0. That bit is reserved in the protocol for future command set expansion. If a packet is received with that bit set, the downlink acknowledgment status bit will be set, but no other action will be taken. Thus, a command with this bit may be used to test the FTB downlink without disturbing the state of any IP.

TABLE 2

IP Op Codes

| Op Code (4 bits) | Name | Op Code Explanation |
| --- | --- | --- |
| X000 | Downlink Tool Message | All subsequent words in this packet up to the CRC word are passed to the tool as a single message. |
| X001 | Force Uplink CRC Error | The next Uplink Packet sent by the IP after receiving this op code will have an inverted CRC, thus causing a CRC error. |
| X010 | Frame Start | The following word acknowledges the previous uplink packet. This packet begins the transmission of a new frame of data. |
| X011 | Set Window and Delay | The following two words are loaded into the Window and Delay registers of the IP, respectively. Also causes IP uplink and downlink data buffers to be cleared. |
| 0100 | Set Address Code | The six least significant bits of the next word are loaded as the new IP address (two bits Group Code and six bits Index Code). |
| 0101 | Auxiliary Pulse | This operational code will cause the IP to issue a single pulse on the Aux line. |
| 0110 | Enable Repeater Mode | Allows incoming FTB data to be repeated to the tools above and below. |
| 0111 | Enable Loopback Mode | When in Loopback Mode, the IP will load all future downlink data as messages into the IP Uplink Buffer. The data is treated in all respects as if it had been written by the tool. The data is not passed to the tool. |
| 1100 | Tool Reset Pulse | This op code will cause the IP to issue a single pulse on the Tool Reset line. |
| 1101 | Sync Pulse | This op code will cause the IP to issue a single pulse on the Sync line. |
| 1110 | Disable Repeaters | Prevents incoming FTB data from being repeated to the tools above and below. |
| 1111 | Disable Loopback Mode | Subsequent downlink data will be forwarded to the tool. |

The interpretation of the "Downlink Message Data" field 38 (0 to 8 words) is dependent upon the IP operational code value in the previous field. The format for each IP operational code is described below. Those IP operational codes not listed below expect a downlink message data field with zero words.

Figure 5:
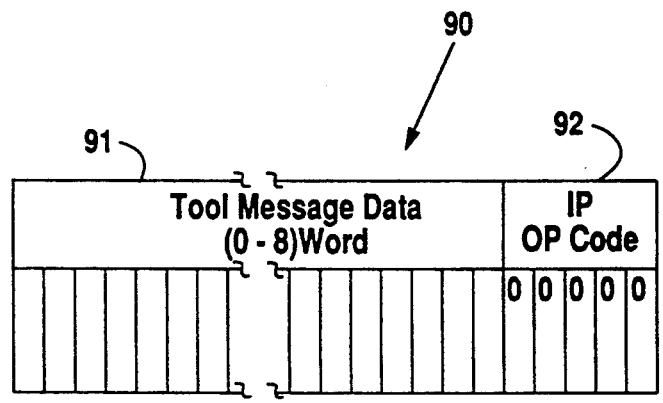
FIG. 5 illustrates the downlink packet data field defining a Tool Message Command.

From 0 to 8 words of data may appear in the "Tool Message Data" field 91 of Tool Message Command 90 as shown in FIG. 5. The number of words of data are equal to the packet length field in the framing protocol. Those words are the tool messages.

Those data are loaded into the IP Downlink Buffer to be passed to the tool without further interpretation by the IP 3a, 3b. When the last word of that message has been read by the tool 2, an indication is given to the tool that the end of the message has been reached. If the Downlink Buffer is full, the packet is rejected and a status indication is sent on the uplink. That message format is discussed in more detail below in the description of the message protocol.

When a frame is started, the Frame Start Command 60 (FIG. 6) is expected in the "Packet Data" 35 of Downlink Packet 30 (FIG. 2). That format contains the uplink acknowledgments for all IPs. Each IP selects the bit corresponding to its address index code to determine if the previous uplink packet has been received correctly. For example, an IP with address index code of 1001 would examine bit A9. If that bit is set, it is considered an acknowledgment of the previous uplink packet and a new uplink packet will be sent. If that bit is cleared, the previous uplink packet will be repeated.

For the Set Window and Delay Command 70 in the preferred embodiment, exactly two words of data are expected in the downlink message field as shown in FIG. 7. The least significant ten bits of the first word are the new Window Value 72 for the IP and are loaded into the IP Window Register. The Window Value 72 can be set from 0 to 1019. A window value of 0 prevents any tool data from being transmitted, but uplink packets with no tool data are still transmitted. A minimum window value of 2 is required to send tool data. A window value of 1 is invalid and is not used. The second word is an 11-bit Delay Value 73. It is loaded into the IP Delay Register. The Delay Value 7 can be set from 1 to 2048. Whenever that packet is received, the downlink and uplink IP data buffers are cleared and a buffer reset indication is given to the tool 2a, 2b.

The Window and Delay Registers in the current embodiment control the Time Domain Multiple Access of the Uplink Packets 40 from each of the IPs in the tool string 4. The Delay Register determines how many words of delay to wait after a Frame Start Command 60 before sending an uplink packet. The Window Register determines the maximum number of words of packet data that can be sent in any one packet from that particular IP. Because the Window Register contains the number of tool data words to be transmitted, the maximum uplink packet size is automatically increased by the IP to compensate for the uplink packet overhead. In the preferred embodiment, the tool string 4 is configured by assigning a Window Value to each IP 3a, 3b that is sufficient to meet the bandwidth requirements of that tool 2a, 2b. The delay values would be assigned beginning with the bottom IP which would always have at least one word of delay. Then each subsequent IP would be assigned a delay value equal to the previous IP's delay value plus the previous IP's window value plus five packet overhead words plus a "dead time" of two words. That "dead time" is to allow for successive IPs having slightly different FTB clock rates.

For the Set Address Code Format 80 in the preferred embodiment, exactly one word of data is expected in the downlink message field as shown in FIG. 8. The least significant six bits of the Address Code 82 become the new IP address and are loaded into the IP Address Register. The four least significant bits are the Index Code and the two most significant bits are the Group Code.

(b) Uplink Packet Data Format

Figure 9:
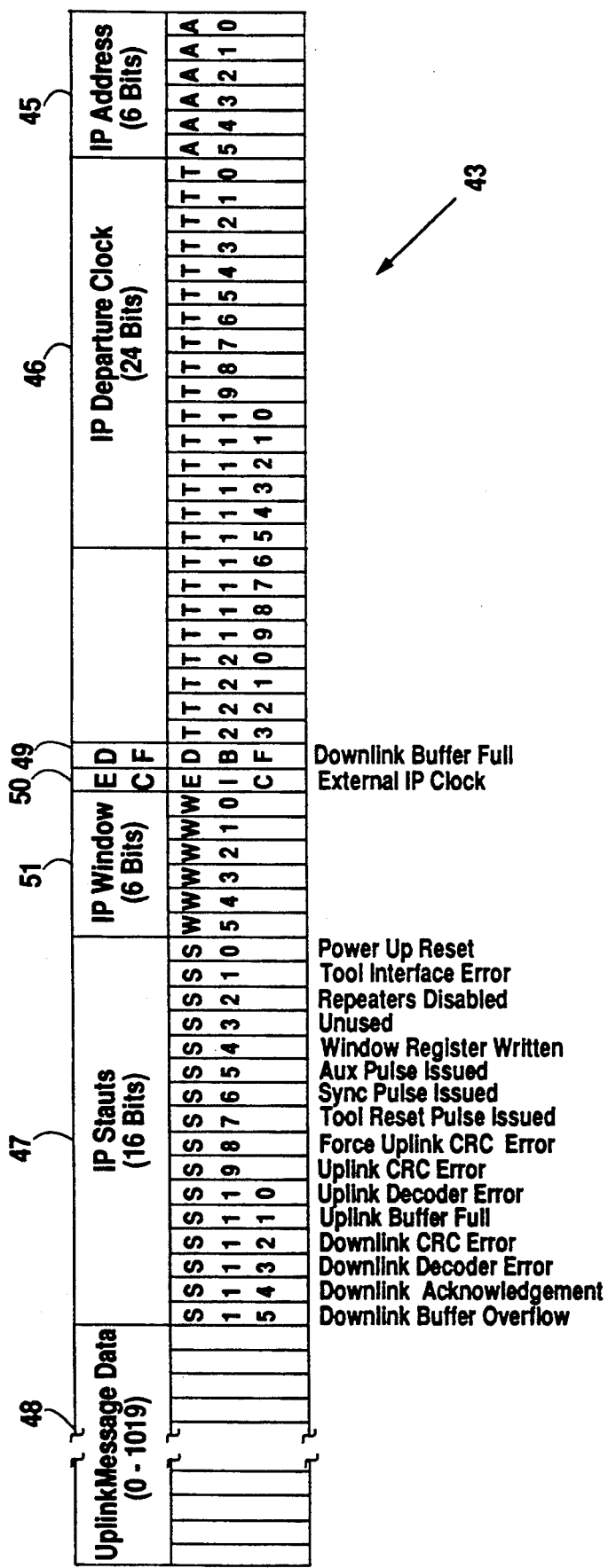
FIG. 9 is a detailed illustration of the uplink packet data fields.

The transport protocol defines the contents of the Uplink Packet Data field 43 as shown in FIG. 9. The Uplink Packet Data field 43 is shown in the framing protocol of the preferred embodiment as a field of 54 bits plus 0 to 1019 words. The transport protocol is divided into four fields: IP address 45, IP Departure Clock 46, IP status 47, and Uplink Message Data 48.

IP address field 45 echoes the IP's current operating address (Group Code and Index Code). That information is updated every frame, regardless of whether the previous frame was acknowledged.

IP Departure Clock field 46 contains the current value of the IP Clock at the time the packet originates from the IP 3a, 3b. The DTM 14 can determine how long the message was buffered by the IP before transmitting by subtracting the IP Departure Clock value and each individual IP Message Clock value.

DTC 12 will replace the IP Departure Clock field with the Modified Packet Time before transmitting this packet core up the logging cable.

Downlink Buffer Full bit ("DF") 49 is set if the IP Downlink Buffer is currently full. That does not necessarily reflect an error condition in the case of tools that unload data slowly. That bit will be replaced by the DTC 12 with bit 23 of the IP Departure Clock 46 before transmitting this packet core up the logging cable.

External IP Clock status bit ("EC") 50 is set if the EIPC pin of the IP is high. That indicates that the tool has an external clock and automatic IP time stamps are disabled. When that is high, the message time stamp values in the current embodiment will be 32 bits long instead of 16.

IP Window field 51 (6 bits in the preferred embodiment) is an echo of the current state of the IP Window Register. When the MSB of that field is 0, the bottom five bits reflect the lower five bits of the IP Window Register. When the MSB of this field is 1, the bottom five bits reflect the upper five bits of the IP Window Register. The value of the MSB will alternate each frame. In that manner, any two consecutive frames may be used to find the complete 10-bit value of the IP Window Register.

The IP Status Word 47, which consists of 16 bits in the preferred embodiment, relates the current state of the various interfaces into and out of the IP. The IP Status Word bits 47 are updated every frame, regardless of whether the previous frame was acknowledged, with the following exceptions. Bit S0 (Power Up Reset) remains set after a power reset from the tool 2a, 2b until a packet with an Enable or Disable Repeaters command is accepted by this IP. Bits S1 (Tool Interface Error), S4 (Window Register Written), S5 (Aux Pulse Issued), S6 (Sync Pulse Issued), S7 (Tool Reset Pulse Issued), S14 (Downlink Acknowledgment), and S15 (Downlink Buffer Overflow) are not cleared until an uplink frame is acknowledged. The polarity of the bits is such that in normal operation, if no commands are received and no errors have occurred, this word should be 0.

The Power Up Reset bit S0 is set when a power up reset occurs. It is reset when the IP repeaters are enabled.

The Tool Interface Error bit S1 is set if the IP detects that any interface between the IP and the tool 2 was operated out of the specified operating range. Generally, that indicates that there is a hardware problem in the tool, and that the Tool Message Data 91 in this and perhaps subsequent packets is questionable.

If the IP repeaters are currently disabled, the Repeaters Disabled bit S2 is set.

The Window Register Written bit S4 is set if the IP 3 has received a command to write the window and delay registers during the last frame.

The Aux Pulse Issued bit S5 is set if an Auxiliary Pulse was issued by the IP.

The Sync Pulse Issued bit S6 is set if a Sync pulse was issued by the IP.

The Tool Reset Pulse Issued bit S7 is set if a Tool Reset pulse was issued by the IP.

The Force Uplink CRC Error bit S8 is set if the IP is intentionally creating an invalid CRC by inverting the CRC value due to having received a Force Uplink CRC Error command.

The Uplink CRC Error bit S9 is set if any uplink packet entering the IP repeater has an invalid CRC.

The Uplink Decoder Error bit S10 is set if at any point while an uplink packet was in progress the IP decoder circuit determined that there was not sufficient margin for reliable decoding. If that is not also accompanied by an uplink CRC error, no data were actually lost, but that indicates a probable FTB hardware problem or an excessively noisy tool.

The Uplink Buffer Full bit S11 is set if the IP Uplink Buffer is currently full. That may not necessarily reflect an error condition in the case of tools that load rapid bursts of data into the IP.

The Downlink CRC Error bit S12 is set if any downlink packet entering the IP repeater has an invalid CRC.

The Downlink Decoder Error bit S13 is set if at any point during the transmission of a downlink packet the decoder circuit determined that there was not sufficient margin for reliable decoding. No data is actually lost unless the Downlink Decoder Error bit is accompanied with an UPlink CRC Error bit, but it does indicate a probable FTB hardware problem or an excessively noisy tool.

The Downlink Acknowledgment bit S14 is set if any downlink packet with a Downlink Tool Message Command is accepted. The exception is if a downlink message packet is received when the IP Downlink Buffer is full. In that case, the packet is not acknowledged, but the Downlink Buffer Overflow status bit is set. That bit is also set if any packet is accepted with bit C4 of its operational code set.

The Uplink Message Data field 48 in the preferred embodiment contains from 0 to 1019 words of uplink messages written to the IP by the tool. Its maximum size is restricted to the window size, which is no more than 1019 words. The actual size of this field is determined by how much data is actually written to the IP 3, but it will never exceed the window size. The amount of data that may be stored in the IP at any time may not exceed four times the window size. The format of the messages is dictated by the message protocol.

Message Protocol

The message protocol deals with the process of embedding logical messages of varying lengths into physical packets. Since the message lengths have nothing to do with the packet sizes, it is necessary to devise Protocols to reconstruct the logical message boundaries independent of the packet boundaries.

(a) Downlink Message Format

The format is such that downlink messages always begin on a packet boundary. A downlink message in the present embodiment is eight words or less in length, and the complete message is embedded in a single Tool Message Command 90 (FIG. 5).

Whenever a tool message packet is received by an IP, the data are loaded in the Downlink Buffer and a status line is asserted to the tool to indicate that data are available. The tool reads the data until the status line is deasserted, indicating that all of the data have been read. After all of the data have been read, a status line is asserted, indicating that the message is complete.

Although that method of packetizing downlink messages simplifies implementation, it does not use the bandwidth effectively for short message lengths. However, it is expected that tools which need high downlink throughput will use eight-word messages.

(b) Uplink Message Format

Uplink messages are embedded in packets in a linked list format. The first word of uplink message data is a List Head. It is a point to the first message field in the packet. Because there is no constraint for messages to begin on packet boundaries, and in fact messages may span several packets, the List Head may point to any location in the packet. A pointer value of 0 would point to the List Head location. A pointer value of 1 would point to the first word after the List Head. Because the List Head need never point to itself, the value of 0 is considered a null pointer, indicating that there are no message fields in the packet. Data in the packet up to the location pointed by the List Head are appended to the end of the previous message, and the message is flagged as complete. If the List Head is null, all of the data in the packet are appended to the previous message and the message is flagged as incomplete. In the preferred embodiment, only the least significant bits of the List Head are used; the most significant six bits are always 0.

The location pointed by a non-null List Head is always the first word of the next message. The first word of each message is a pointer to the first word of the next message. That pointer chain may be followed in each packet to reconstruct the message boundaries. The last pointer in the chain may have a null value, indicating that the message is continued with the next packet.

In that manner, a number of small messages may be embedded in a single packet with only a one-word overhead per message. Also, arbitrarily long messages are allowed due to the continuation structure. Finally, because messages are freed from starting and ending on packet boundaries, fixed size packets are always completely filled as long as there are any data to be sent. The only time that a packet will be shorter than its window allocation is when there are no more buffered data to send.

Each message consists of a pointer to the next message, a 16-bit IP Message Clock Value, and an arbitrary number of words of message data. Because messages are not in any way aligned with packet boundaries, the messages are reconstructed across packet boundaries using the List Head and the Next Message Pointers in each message.

The first word of each message is a Next Message Pointer (NMP) (16 bits in the preferred embodiment) which points to the first word of the next message. It is defined the same as the List Head, except that the List Head occurs exactly once per packet, and the Next Message Pointer occurs exactly once per message.

The next 16 or 32 bits of each message is the time stamp value of the message. If the EIPC pin 50 is low, that is the 16-bit value of the IP Clock corresponding to the time that the first word of message data was written. That field is automatically inserted by the IP when the tool 2a, 2b writes the first word (second byte) of a message.

If the EIPC pin 50 is high, the IP does not automatically insert a time stamp. Instead, it is the responsibility of the tool 2a, 2b to provide a 32-bit relative or absolute time stamp. In the case of a tool-generated relative time stamp, only the lower 24 bits are significant. The upper eight bits must be 0. For absolute time stamps, the lower 31 bits are significant. The MSB must be 1.

The remainder of the message are the tool data. That is an arbitrary number of words written to the IP 3a, 3b by the tool 2a, 2b. When the tool finishes writing a particular message, it asserts an end-of-message indication to the IP. The IP then updates the pointer structure to reflect the end of the message.

In the example of the preferred embodiment of the present invention shown in FIG. 10, a tool is depicted as having received a downlink message, and as a result of that message, it has bursted a series of messages into the IP and stopped. The messages shown are three words, 13 words, three words, three words, and two words. That tool has a window allocation of seven words, an address of 1010, repeaters are enabled and no link errors are occurring.

The data are divided into six packets. Uplink packet #0 acknowledges the last downlink packet and has the complete uplink message #0 in it. In addition, because one word is left over, the NMP for message #1 is placed in that packet. The List Head has a value of 1 to point to the NMP in message #0. The NMP for message #0 has a value of 6 to point to the NMP of message #1. The NMP of message #1 is set to 0, the null value, to indicate that no other NMPs are in the packet.

Packet #1 contains the continuation of message #1. Because message #1 is not completed in that packet, the List Head is set to 0. Packet #2 also continues message #1. Packet #3 concludes message #1 and contains the beginning of message #2. Packet #4 concludes message #2 and message #3. Because that message ended exactly at a packet boundary, it is not possible to determine that the message is finished until packet #5 arrives. Packet #5 contains message #4. It also contains a null NMP for message #5, which has not been written by the tool yet. That null NMP marks the end of message #4. When the tool does send more data, the NMP for the next message will have been sent. Thus, the packet with that message will begin with the Message Clock word for message #5. Packet #5 is not full because there are no data left to be sent. That protocol insures that packets will be full as long as data are available, and have an overhead of only one word per message. In addition, it allows messages to be of arbitrary length.

Figure 11:
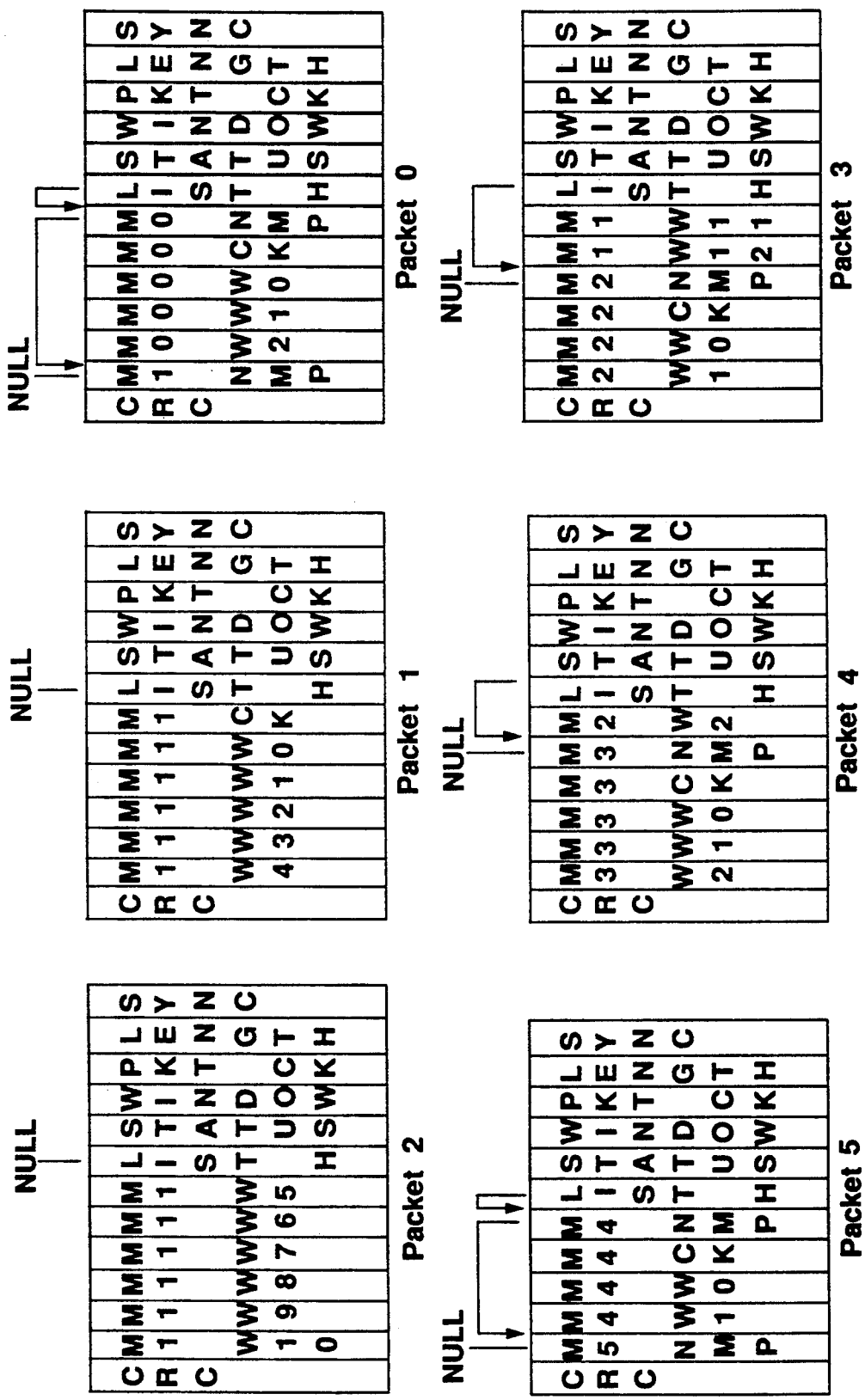
FIG. 11 illustrates the same example as FIG. 10 in a compressed format.
Figure 12:
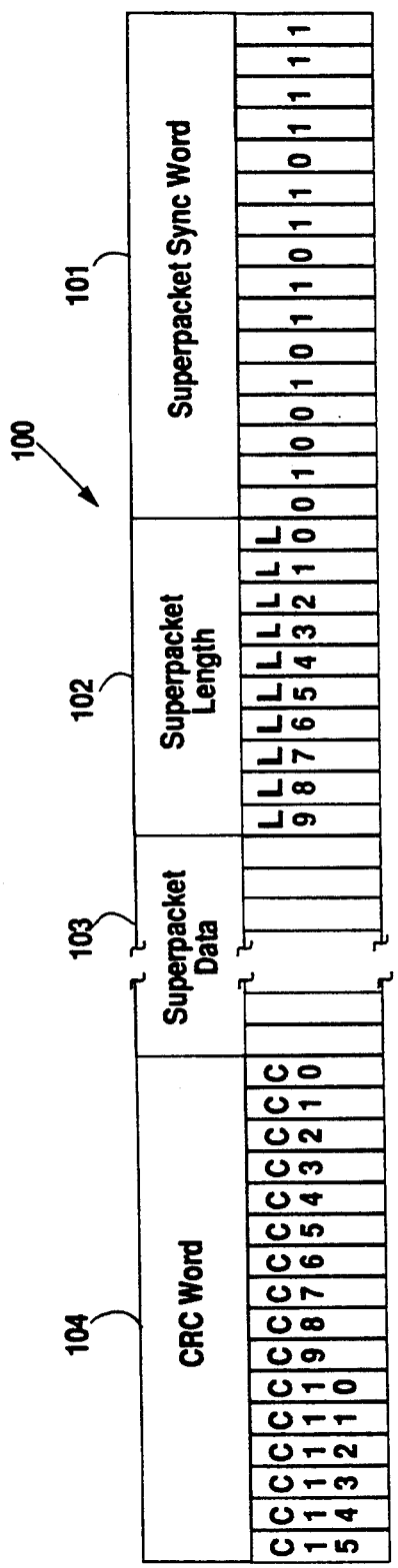
FIG. 12 illustrates the fields of a downlink superpacket.

The illustration in FIG. 11 shows the preferred embodiment with the same six packets in a compressed format to better illustrate the operation of the List Head and NMP pointer scheme.

LOGGING CABLE PROTOCOL (DTC TO DTM)

The link protocol in this section refers to the transmission of data between the DTC 12 and the DTM 14.

That transmission is on the logging cable 16 in a half-duplex link.

The acknowledgment method of the preferred embodiment in the DTC to DTM protocol is similar to that for the tool bus 10, except that 32 buffers are used instead of 16. However, the benefits of that method with respect to the toolbus also apply to the application of that acknowledgment method to the logging cable link.

A Frame Start Command 60 causes each IP to change to the the uplink transmission direction. Until a particular IP delay has expired, it repeats data from the tools below. The bottom interface package IP is assigned a very short delay value and begins transmitting a packet, with the maximum length of the packet determined by the window value. Once that transmission is complete, that IP switches to the downlink direction and waits for further downlink packets. The next IP begins transmission after its delay has expired, followed by each subsequent IP until all have transmitted. At this point, all IPs are pointed in the downlink direction and downlink packets may be sent, with each tool repeating each downlink packet to the tool below. After all queued downlink packets have been sent, another Frame Start Command 60 is sent and the process is repeated. Thus, each tool receives its necessary allocation in a timely way. That minimizes buffering and hardware complexity.

During certain intervals, there will be no transmitter driving the link between particular interface packages. That occurs, for example, when a particular Head and NMP pointer scheme.

LOGGING CABLE PROTOCOL (DTC TO DTM)

The link protocol in this section refers to the transmission of data between the DTC 12 and the DTM 14. That transmission is on the logging cable 16 in a half-duplex link.

The acknowledgment method of the preferred embodiment in the DTC to DTM protocol is similar to that for the tool bus 10, except that 32 buffers are used instead of 16. However, the benefits of that method with respect to the toolbus also apply to the application of that acknowledgment method to the logging cable link.

A Frame Start Command 60 causes each IP to change to the the uplink transmission direction. Until a particular IP delay has expired, it repeats data from the tools below. The bottom interface package IP is assigned a very short delay value and begins transmitting a packet, with the maximum length of the packet determined by the window value. Once that transmission is complete, that IP switches to the downlink direction and waits for further downlink packets. The next IP begins transmission after its delay has expired, followed by each subsequent IP until all have transmitted. At this point, all IPs are pointed in the downlink direction and downlink packets may be sent, with each tool repeating each downlink packet to the tool below. After all queued downlink packets have been sent, another Frame Start Command 60 is sent and the process is repeated. Thus, each tool receives its necessary allocation in a timely way. That minimizes buffering and hardware complexity.

During certain intervals, there will be no transmitter driving the link between particular interface packages. That occurs, for example, when a particular Superpacket Sync Word 101 ("Sync Word", 16 bits in the preferred embodiment) is used to identify the start of each downlink superpacket. That word, in the preferred embodiment, is the bit stream 0100101101101111.

Downlink Superpacket Length 102 ("Superpacket Length", ten bits in the preferred embodiment) determines how many words of downlink superpacket data will follow. A value of 0 indicates that the CRC Word 104 follows directly after six bits of downlink superpacket data. The maximum value of this field, in the current embodiment, is 1023 words.

In the preferred embodiment, up to 1023 data words plus six bits may be placed in the Downlink Superpacket Data field 103 ("Superpacket Data". The six bits are used in the transport protocol to set the Downhole Cable Modem uplink mode.

CRC Word 104 (16-bits in the preferred embodiment) is computed from the value of all of the data in the packet with the exception of the Sync Word 101. That computation is based on the polynomial $X^{16}+X^{12}+X^5+1$. If the CRC 104 is incorrect, the packet is ignored. Otherwise, it is interpreted by the transport protocol.

(b) Uplink Superpacket Format

Figure 13:
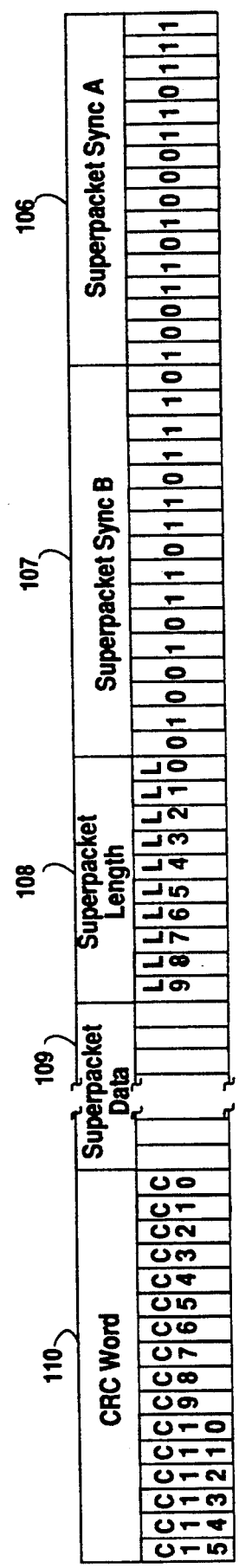
FIG. 13 illustrates the fields of an uplink superpacket.

Uplink Superpacket Format 105 is expressed in the collection of fields shown in FIG. 13, which are collectively referred to as an uplink superpacket. Uplink superpackets in the current embodiment may be 7 to 1027 words in length.

Superpacket Sync Words A 106 and B 107 ("Sync Words", 32 bits in the preferred embodiment) are used to identify the start of each packet. Those words are the bit stream 01001011011011111100110100011101111.

Uplink Superpacket Length 108 ("Superpacket Length", 10 bits in the preferred embodiment) determines how many words of uplink superpacket data will follow. A value of 0 indicates that the CRC Word 110 follows directly after six bits of uplink packet data. The maximum value of this field is 1023 in the current embodiment.

In the preferred embodiment, from 5 to 1023 data words plus six bits may be placed in the Uplink Superpacket Data field 109 ("Superpacket Data"). The six bits contain the current Downhole Cable Modem uplink operating mode and are discussed below in the transport protocol.

Finally, a 16-bit CRC Word is computed from the value of all of the data in the packet with the exception of the sync words. That computation is based on the polynomial $X^{16}+X^{12}+X^51$.

Transport Protocol

As before, the transport protocol defines the formatting and status relating to retransmission of packets, time synchronization, link health monitoring, and data routing.

In normal operation, one downlink superpacket is sent per cable frame. If that superpacket is received in error, the DTC 12 will ignore it. Otherwise, the DTC 12 will begin an upward transmission. If the DTM 14 does not detect an uplink superpacket within a time-out period, it will retransmit the previous downlink superpacket. That process will be repeated until the DTC 12 finally receives the downlink superpacket and begins uplink transmission. If the DTM 14 has to repeat the same downlink superpacket more than four times, in the present embodiment, it will notify the central computer 20.

On each cable frame, the DTC 12 will transmit several uplink superpackets. After the DTC 12 has been transmitting on the uplink for its programmed time-out, it finishes the superpacket in progress and waits for another downlink transmission.

That protocol allows half duplex transmission on the logging cable and embedded acknowledgment for error-free transmission on the downlink and uplink.

(a) Downlink Superpacket Data Format

Figure 14:
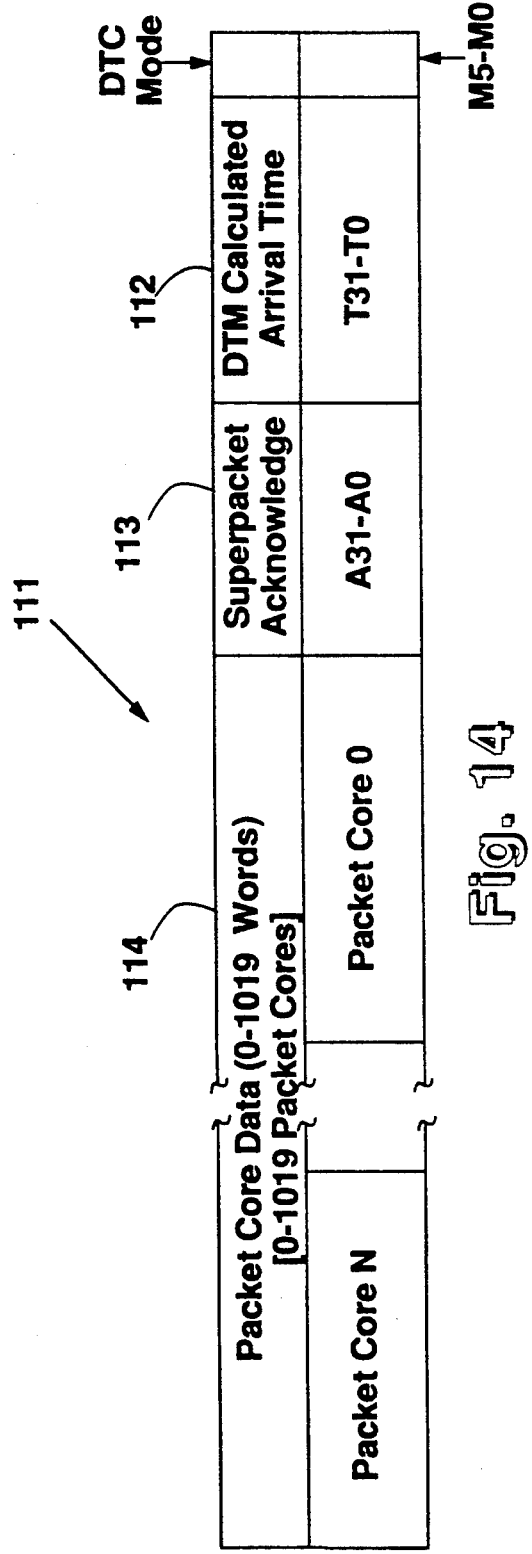
FIG. 14 is a detailed illustration of a downlink superpacket data field.

The transport protocol describes the handling of the superpackets by the DTC 12. The Downlink Superpacket Data Format 111 (FIG. 14) of the preferred embodiment is shown in the framing protocol as a field of six bits plus 4 to 1023 words. For the transport protocol, that is divided into the three fields as shown in FIG. 14: DTM Calculated Arrival Time 112, the Superpacket Acknowledge 113 (Uplink), and optional Downlink Packet Core Data 114. The six least significant bits of the Downlink Superpacket Data field 111 are unused in this embodiment.

The DTM 14 calculates the time this superpacket is expected to arrive at the DTC 12 and inserts that 32-bit clock value in the DTM Calculated Arrival Time field 112.

The 32 bits of the Superpacket Acknowledge field 113 select which of the DTC uplink buffers have been correctly received by the DTM 14. Each uplink superpacket contains an Index Field corresponding to the DTC buffer which contains that superpacket. That is used to set a particular bit in the Superpacket Acknowledge 113 Because there are 32 buffers in the DTC, each bit selects a particular buffer that has been correctly received and can be reused.

A downlink packet core consists of a complete FTB downlink packet as described above with the Packet Sync Word and CRC Word removed. The packet cores of all downlink packets to be sent to the IPs are inserted here. In the preferred embodiment, the minimum size of a packet core is one word and the maximum size of a packet core is nine words. The DTC 12 will take each packet core, add a Sync and CRC Word to make a complete downlink packet, and transmit it down the FTB during the next FTB downlink transmission.

(b) Uplink Superpacket Data Format

Figure 15:
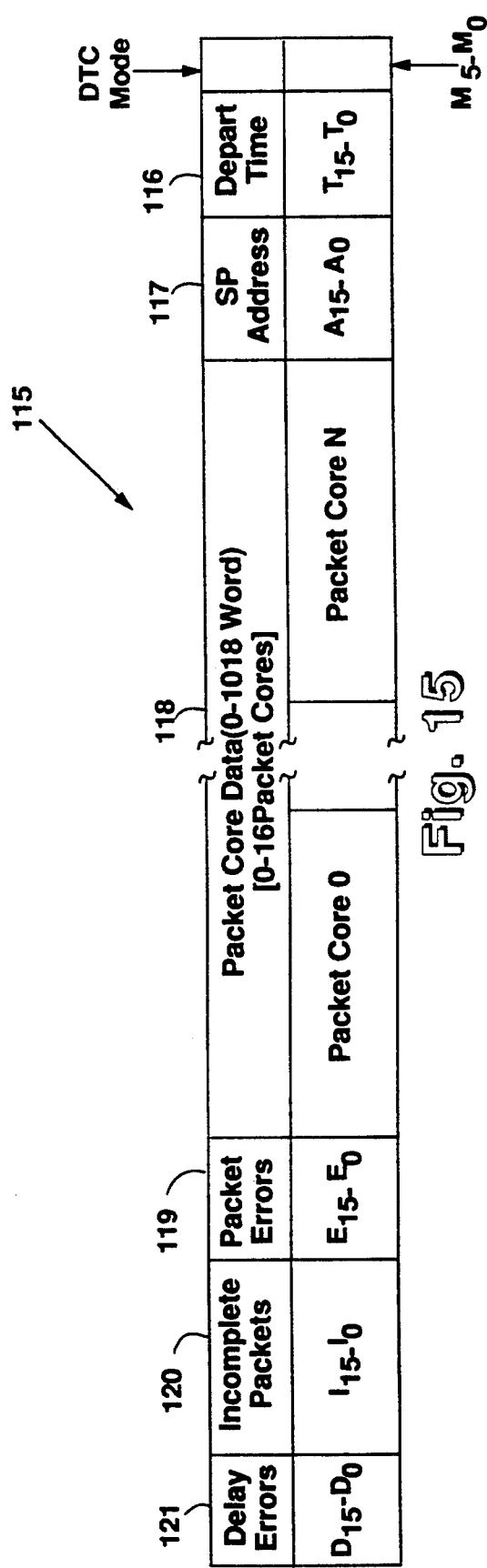
FIG. 15 is a detailed illustration of an uplink superpacket data field.

The transport protocol defines the contents of the uplink superpacket data field. The uplink superpacket data field 115 (FIG. 15) in the preferred embodiment is shown in the framing protocol as a field of six bits plus 4 to 1023 words. For the transport protocol, that is divided into the six fields shown in FIG. 15: DTC Superpacket Departure Time 116, Superpacket Address 117, Uplink Packet Core Data 118, Packet CRC Errors Detected Word 119, Incomplete Packets Detected Word 120 and TDMA Delay Errors Detected Word 121. The six least significant bits of the Uplink Superpacket Data field 115 are unused in this embodiment.

The 16 low order bits of the DTC Slave Clock are latched at the time that this uplink superpacket originates from the DTC 12 and placed in the DTC Superpacket Departure Time field 116.

The lower five bits of the Superpacket Address field 117 (16 bits in the preferred embodiment) are referred to as the Superpacket Index. That value corresponds to the DTC buffer where the data in that superpacket are stored, and are used for acknowledgment.

The next ten bits of that field are the Superpacket Sequence. The DTC latches bits {21 ... 12} of the DTC Slave Clock (bit 0 is the LSB) when the FTB frame contained in this superpacket began. That is the Super-Packet Sequence number for this superpacket. Because Frame Starts occur when the lower 12 bits of the Slave Clock roll over, bits {21 ... 12} form a binary number that increments by one for each uplink superpacket.

The most significant bit of the field (A15) is the Sequence Counter Load field. If that bit is set, the DTC superpacket sequence counter was loaded between this superpacket and the previous superpacket. The DTM 14 detects that bit and uses it to reset its superpacket and message buffers. All data buffered from previous superpackets will be discarded, and processing will resume with the current superpacket.

The Superpacket Sequence is used by the DTM to keep track of the order of the superpackets in the event that retransmission causes the packets to be received out of order. Since the buffer order is not the sequence order, the DTC 12 must select by sequence number which buffers to send such that the older buffers can be sent first. That keeps latency to a minimum.

Figure 16:
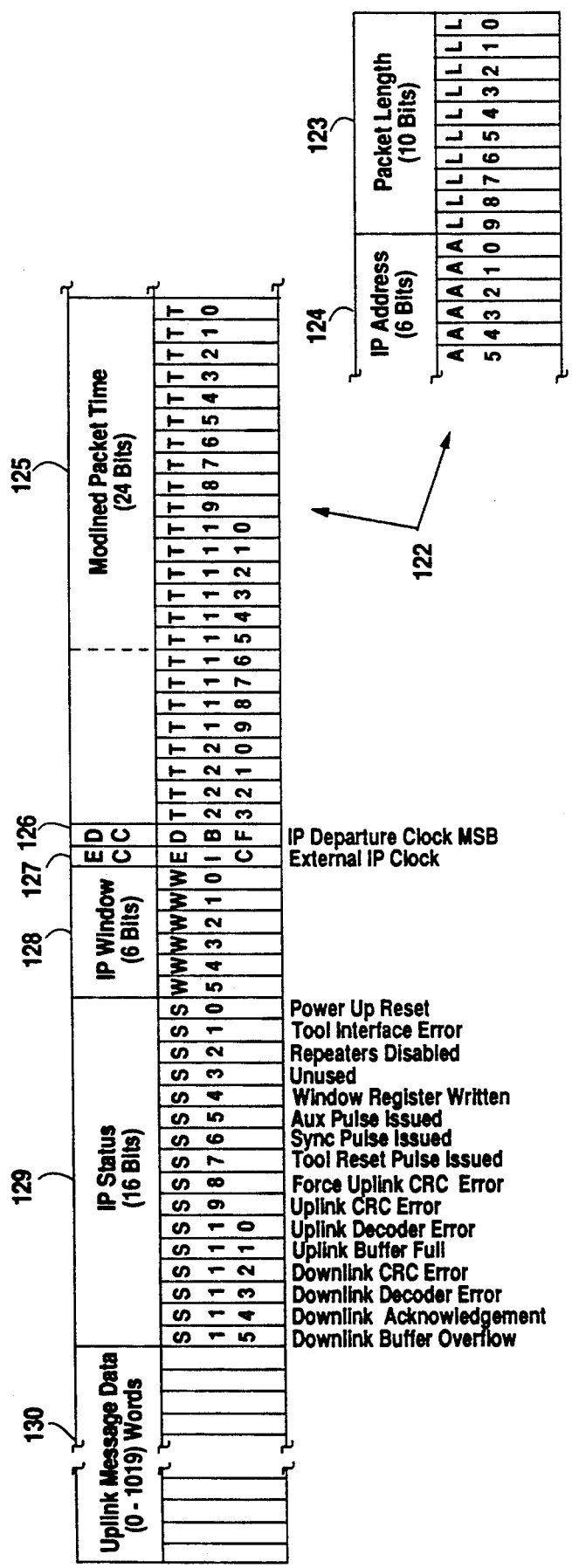
FIG. 16 is a detailed illustration of the packet core of an uplink superpacket data field.

The Packet Core Format 122 is shown in FIG. 16. A packet core in the preferred embodiment consists of Packet Length 123 (10 bits), IP Address 124 (6 bits), Modified Packet Time 125 (24 bits), IP Departure Clock MSB 126, External IP Clock 127, IP Window 128 (6 bits), IP Status 129 (16 bits) and Uplink Message Data 130 and operates as an FTB uplink packet as described above with the Packet Sync Word and CRC Word removed, and the IP Departure Clock modified. The Modified Packet Time 125 is calculated by taking the 24-bit DTC clock at the time the packet arrived and subtracting the IP Departure Clock. In addition, the Downlink Buffer Full status bit is stripped off by the DTC and is replaced by the MSB of the IP Departure Clock.

The packet cores of all IPs whose data was received correctly in a given FTB frame are inserted here. In the absence of FTB errors, there is exactly one packet core per IP 3, but link errors may cause the packets from some IPs to be discarded by the DTC 12. In no case is there ever more than one uplink FTB packet core from any particular IP 3 in a given uplink superpacket.

Because the maximum size of the packet core field in the current embodiment is 1018 words, the sum of all packet cores that may be received in one FTB frame must be less than or equal to that number. Because there are three words of overhead per packet core per IP, the sum of all IP window allocations for all IPs in the string must be less than or equal to 1018 (number of IPs multiplied by 3). That restriction must be enforced by the telemetry software when it sets the window allocations for all tools in the string. One might also note that while the FTB protocol is capable of delivering single packets that will exceed the packet core limitation of 1018 words, in practice the window restrictions enforced by telemetry software will keep that from ever occurring.

The last three words of each superpacket are used to report FTB errors on a per packet basis. Corresponding bits in the Packet CRC Errors Detected Word 119 and the Incomplete Packets Detected Word 120 (FIG. 15) are used to encode four possible error conditions as shown in Table 3.

TABLE 3

FTB Error Report in Superpacket

| Incomplete Packets Detected | Packet CRC Errors Detected | Error Condition |
|---|---|---|
| 0 | 0 | No Packet Error |
| 0 | 1 | Packet CRC Error |
| 1 | 0 | Packet Missing |
| 1 | 1 | Packet CRC Missing |

CRC Errors Detected Word 119 is formed by the DTC 12 based on which packets in the FTB frame forming this superpacket had CRC errors. The bit in the Packet CRC Errors Word 119 corresponding to the address of the packet which had a CRC error is set. For example, if a packet with address 0 and a packet with address 5 were the only packets that had CRC errors in the current FTB frame, then the superpacket formed from this FTB frame will have bits E0 and E5 set in the Packet CRC Errors Word 119.

Incomplete Packets Detected Word 120 is formed by the DTC 12 based on which packets in the FTB frame which form that superpacket had missing sync or CRC words. The bit in the Incomplete Packets Detected Word 120 corresponding to the address of the packet which had a missing Sync or CRC word is set. If that bit is set and the corresponding bit in the Packet CRC Errors Detected 119 bit is set, that indicates a missing CRC word (CRC value of 0). The most probable reason for that condition is that one of the IP oscillators is out of specification. Otherwise, if the Packet CRC Errors Detected 119 bit is not set, the Sync word is missing. That indicates a problem with the window or delay allocations to the IPs, particularly if the packet from the IP below had a CRC error.

TDMA Delay Errors Detected Word 121 is formed by the DTC 12 based on which packets in the FTB frame forming that superpacket had incorrectly timed TDMA delays. The bit in the TDMA Delay Errors Detected Word 121 corresponding to the address of the packet which had a delay error is set.

TIME STAMPS

Automatic Time Stamps

"Automatic" time stamps (i.e., time stamps correlated to the writing of the second message byte) are developed in the following way. The DTC 12 has a Slave Clock synchronized to the DTM's Master Time Clock. The DTC 12 records the value of its Slave Clock whenever an uplink FTB packet first arrives (when the packet sync word is detected), and places that value in the packet header.

Every IP contains a counter (24 bits in the preferred embodiment) which increments every four microseconds. That counter is called the "IP Clock," even though it represents relative time only, and is uncorrelated with any other DTS or central CPU time. When a tool 2a, 2b writes the second data byte (the end of the first 16-bit word) following an End of Message indication, the IP records the value of its IP Clock (IP Message Clock) in the header of the Tool Message Command 90. Just before a packet is sent up, the IP again records the value of its IP Clock (IP Departure Clock) in the packet header. By comparing those two IP Clock values, the length of time the second data byte remained in the IP can be determined. Thus, the time stamp is the DTC Packet Arrival Time minus the IP delay; or:

Time Stamp = DTC Arrival Time − (IP Departure Clock − IP Message Clock)

Because in the preferred embodiment data will not remain in the IP for more than one FTB frame period (16.384 milliseconds), 16 bits of the IP Clock are sufficient for calculating the IP delay, and only the lower 16 bits of the IP clock are used as the IP Message Clock value. For compatibility with "tool event" time stamps, all 24 bits of the IP Clock are written as the IP Departure Clock value in IP Departure Clock Word 46 (FIG. 9).

The DTM 14 actually performs the time stamp calculation. Because the IP Clock could have rolled over between the second byte of the message and the packet departure, the DTM 14 must detect roll-over and compensate. The MSB (most significant bit) of the IP Clock could not change more than once within the short time that data remain in the IP. If the MSB of IP Departure Clock is zero and the MSB of IP Message Clock is one, then roll-over did occur.

DTM 14 thus calculates time stamps from the Slave Clock value at DTC packet arrival, the IP Clock value at the second message byte, and the IP Clock value at packet departure. Each FTB packet will have one DTC Arrival Time and one IP Departure Clock, but could have several IP Message Clock values. To conserve bandwidth, as few bits as possible of those three values are sent up the logging cable. The remainder of this subsection discusses the schemes used to reduce the number of time bits that have to be sent up.

DTM 14 records the value of its Master Time Clock (48 bits in the preferred embodiment) whenever an uplink superpacket arrives. Because in the current embodiment each FTB packet within that superpacket could not have remained in the DTC 12 for much more than a second, 23 bits of DTC Arrival Time are more than enough for the DTM 14 to infer the full Master Time Clock value when the FTB packet arrived at the DTC 12.

In the preferred embodiment, the upper seven of these 23 bits of DTC Arrival Time are always the same as the upper seven bits of the Superpacket Sequence number, which is placed in the header of each uplink superpacket by the DTC 12. The DTC 12 obtains the Superpacket Sequence number by latching bits {12 ... 22} of the Slave Clock at the Frame Start Command 60 leading to that superpacket. Because no more than 16384 microseconds can elapse between a Frame Start Command 60 and DTC packet arrival, the upper seven bits cannot change between these two events. Thus, 16 bits of DTC Arrival Time are more than sufficient for the time stamp calculation in addition to the Superpacket Sequence number and the DTM superpacket arrival time.

To further conserve bandwidth, the DTC 12 subtracts IP Departure Clock from the DTC Arrival Time (16 bits in the preferred embodiment) for each FTB packet within an uplink superpacket, and sends up only the difference. That difference will be referred to as the "Modified Packet Time" and will placed in the Modified Packet Time Word 125 (FIG. 16). That subtraction corresponds to the first operation of the time stamp equation:

Time Stamp = DTC Arrival Time − (IP Departure Clock − IP Message Clock)

or

Time Stamp = DTC Arrival Time − IP Departure Clock + IP Message Clock

For each message beginning in an FTB packet, the DTM 14 must add IP Message Clock to the Modified Packet Time to derive a time stamp.

As mentioned earlier, the DTM 14 examines the MSB of the IP Departure Clock value and the MSB of the IP Message Clock value to determine if the IP Clock rolled over. To permit that roll-over detection, every superpacket sent up the logging cable must include the MSB (T23) of the IP Departure Clock Word 46 (FIG. 9) for every FTB packet within it. The full IP Departure Clock Word 46 is not available to the DTM 14, because DTC 12 combines the IP Departure Clock Word 46 with the DTC Arrival Time to form the "Modified Packet Time" placed in the Modified Packet Time Word 125 (FIG. 16). For every FTB uplink packet it receives, the DTC 12 replaces the IP Departure Clock Word 46 with the Modified Packet Time Word 125, and places the MSB (T23) of the IP Departure Clock Word 46 just after the Modified Packet Time Word 125.

In the preferred embodiment, when DTC 12 subtracts the IP DeParture Clock Word 46 from the DTC Arrival Time, an underflow may result. To express it another way, a borrow from the next higher bit of the DTC Arrival Time should occur, but is ignored since the DTC 12 does not use a full 48-bit arrival time value. As with the IP Clock roll-over, the DTM must detect that underflow and compensate for it. Underflow can be determined from the values of:

- the MSB (T23, FIG. 16) of the Modified Packet Time Word 125 (which is DTC Arrival Time − IP Departure Clock Word 46);
- the fourth bit of the Superpacket Sequence, which is the 16th bit of the Slave Clock;
- the MSB (T23, FIG. 9) of the IP Departure Clock Word 46.

Tool Event Time Stamps

The preferred embodiment of the present invention also allows for a tool 2a, 2b to choose to have its time stamps correlate to some internal event, rather than to the writing of the second message byte. In that embodiment if the "EIPC" (External IP Clock) pin of the IP connector is wired to +5 V (not shown), the IP will not write an "IP Message Clock" value at the beginning of each tool message. Instead, the tool must begin each message with four bytes (32 bits) of a clock value.

There are two ways a tool can generate that message clock value. If the tool has a slave clock tracking the absolute value of the DTM's Master Time Clock, the lower 31 bits of that clock would be latched at the desired event, then written to the IP on the tool as the first four bytes of a new message. The most significant bit of that 32-bit value can then be used to indicate that this is an absolute time.

A simpler method is for the tool to have a 24-bit binary counter that is synchronized to the IP Clock. The value of that counter would be latched at the desired event, then written as the first three message bytes. The fourth message byte must be zero to indicate that is a relative time value.

III. Summary of Time Stamping Calculations

A. Automatic Relative Time Stamps

An algorithm for calculation of message time stamps for automatic time stamps is as follows:

1. IP Message Clock $\{15 \ldots 0\}$ = IP Clock value at the time the second byte of the message (the end of the first 16-bit word) was written to the IP.
2. IP Departure Clock $\{15 \ldots 0\}$ = IP Clock value when transmission of the packet up the Fast Tool Bus began.
3. DTC Arrival Time $\{21 \ldots 0\}$ = Slave Clock value when the packet sync word was detected by the DTC.
4. DTM Arrival Time $\{47 \ldots 2\}$ = Master Time Clock value when the superpacket sync word was detected by the DTM.
5. Systematic Delay $\{15 \ldots 0\}$ = Total average delay from IP to DTC and DTC to DTM.
6. Superpacket Sequence $\{21 \ldots 12\}$ = DTC Arrival Time $\{21 \ldots 12\}$. (Note: This arrival value is the same for all packets in a superpacket, so it is sent only once per superpacket.)
7. Modified Packet Time $\{15 \ldots 0\}$ = DTC Arrival Time $\{15 \ldots 0\}$ − IP Departure Clock $\{15 \ldots 0\}$.
8. Corrected DTM Arrival Time $\{47 \ldots 22\}$:
    If
    ((Superpacket Sequence $\{21\}$1) AND
    (DTM Arrival Time $\{21\}$ = 0))
    Then Corrected DTM Arrival Time $\{47 \ldots 22\}$ = DTM Arrival Time $\{47 \ldots 22\}$ − 1
    Else Corrected DTM Arrival Time $\{47 \ldots 22\}$ = DTM Arrival Time $\{47 \ldots 22\}$
9. Extended DTC Arrival Time $\{47 \ldots 16\}$ = Corrected DTM Arrival Time $\{47 \ldots 22\}$ . . . Superpacket Sequence $\{21 \ldots 16\}$
10. Corrected DTC Arrival Time $\{47 \ldots 16\}$:
    If
    ((Superpacket Sequence $\{15\}$ = 0) AND
    (IP Departure Clock $\{15\}$ = 1)) OR
    ((Superpacket Sequence $\{15\}$ = 0 AND
    (Modified Packet Time $\{15\}$ = 1)) OR
    ((IP Departure Clock $\{15\}$ = 1) AND
    (Modified Packet Time $\{15\}$ = 1))
    Then Corrected DTC Arrival Time $\{47 \ldots 16\}$ = Extended DTC Arrival Time $\{47 \ldots 16\}$ − 1
    Else Corrected DTC Arrival Time $\{47 \ldots 16\}$ = Extended DTC Arrival Time $\{47 \ldots 16\}$
11. Modified DTC Arrival Time $\{47 \ldots 16\}$:
    If
    ((IP Message Clock $\{15\}$ = 1) AND
    (IP Departure Clock $\{15\}$ = 0))
    Then Modified DTC Arrival Time $\{47 \ldots 16\}$ = Corrected DTC Arrival Time $\{47 \ldots 16\}$ − 1
    Else Modified DTC Arrival Time $\{47 \ldots 16\}$ = Corrected DTC Arrival Time $\{47 \ldots 16\}$
12. Extended Modified Packet Time $\{47 \ldots 0\}$ = Modified DTC Arrival Time $\{47 \ldots 16\}$ . . . Modified Packet Time $\{15 \ldots 0\}$
13. Message Time Stamp $\{47 \ldots 0\}$ = Extended Modified Packet Time $\{47 \ldots 16\}$ + IP Message Clock $\{15 \ldots 0\}$ − Systematic Delay $\{15 \ldots 0\}$ B. External Relative Time Stamps The procedure for calculation of message time stamps for external relative time stamps is the same as for automatic relative time stamps. However, the algorithm must be slightly modified in the present embodiment to work with 24-bit relative time instead of 16-bit relative time. The modifications are as follows:

1. IP Message Clock }23...0} = External relative clock value.

IP Departure Clock {23...0} = IP Clock value when transmission of the packet up the Fast Tool Bus began.

Modified Packet Time {23...0} = DTC Arrival Time {23...0} − IP Departure Clock {23...0}.

4. Corrected DTC Arrival Time {47...24}:
   If
   ((Superpacket Sequence {23} = 0) AND
   (IP Departure Clock {23} = 1)) OR
   ( Superpacket Sequence {23} = 0) AND
   (Modified Packet Time {23} = 1)) OR
   ((IP Departure Clock {23} = 1) AND
   (Modified Packet Time {23} = 1))
   Then Corrected DTC Arrival Time {47...24} = Corrected DTM Arrival Time {47...24} − 1
   Else Corrected DTC Arrival Time {47...24} = Corrected DTM Arrival Time {47...24}

5. Modified DTC Arrival Time {47...24}
   If
   ((IP Message Clock {23} = 1) AND
   (IP Departure Clock {23} = 0))
   Then Modified DTC Arrival Time {47...24} = Corrected DTC Arrival Time {47...24} − 1
   Else Modified DTC Arrival Time {47...24} = Corrected DTC Arrival Time {47...24}

6. Extended Modified Packet Time {47...0} = Modified DTC Arrival Time {47...24}... Modified Packet Time {23...0}

7. Message Time Stamp {47...0} = Extended Modified Packet Time {47...0} + IP Message Clock {23...0} − Systematic Delay {15...0}

C. External Absolute Time Stamps

The algorithm for calculation of message time stamps for absolute time stamps is as follows:

IP Message Clock {30...0} = External absolute clock value.

2. DTM Arrival Time {37...30} = Master Time Clock value when the superpacket sync word was detected by the DTM.

3. Corrected DTM Arrival Time {47...30}:
   If
   ((IP Message Clock {30} = 1) AND
   (DTM Arrival Time {30} = 0))
   Then Corrected DTM Arrival Time {47...30} = DTM Arrival Time {47...30} = 1
   Else Corrected DTM Arrival Time {47...30} = DTM Arrival Time {47...30}

4. Message Time Stamp {47...0} = Corrected DTM Arrival Time {47...30}... IP Message Clock {29...0}

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

What is claimed is:

1. A data communication method for transmitting data by uphole and downhole modems from a plurality of well-logging tools along a tool bus, comprising the steps of:

receiving variable length data from a tool by an individual interface package to form an interface package data transmittal.

transmitting said data into an uplink packet provided with a data field and a protocol;

applying said protocol to transform said data field into varying lengths to receive a plurality of said interface package data transmittal of varying lengths;

beginning said variable length data field with a list head word pointing to the beginning of a first word of a first interface package transmittal, said first interface package transmittal having as the first word, a next message pointer, said pointer pointing to the first word in a next interface package transmittal, thereby sequentially packing a plurality of interface package transmittal of varying length into said data field;

stripping said protocol from said uplink packets;

transmitting said uplink package to an uplink superpacket having an address and a plurality of stripped uplink packages; and transmitting said uplink superpacket from a downhole modem to an uphole modem, wherein data words of varying length are sequentially packed and then transmitted on limited bandwidth communication links.

2. A data communication method as in claim 1 wherein said interface package provides tool depth information to the uphole modem, comprising the steps of:

detecting the time of arrival of a data message from a tool;

recording said data arrival time in an interface package;

detecting the time of arrival of an end of said message;

recording said end of message time in said interface package;

recording the departure time just prior to transmitting said interface package to the surface;

transmitting said interface package to a surface location;

subtracting said end of message time from said departure time to equal a value and subtracting the value from said data arrival time yielding a time stamp resultant; and correlating said time stamp to the specific depth of a well-logging tool.

3. A data communication as in claim 1, comprising the steps of:

formulating an acknowledgment word containing a plurality of interface package transmittal acknowledgment identifying bit positions;

identifying successful interface package transmittals in said acknowledgment word by setting said bit position in said acknowledgment word;

identifying unsuccessful interface package transmittals in said acknowledgment word by resetting said bit position in said acknowledgment word;

transmitting said acknowledgment word to all interface packages;

examining said transmitted acknowledgment word by all interface packages along the tool bus; and determining a set condition and a reset condition of said acknowledgment bit, whereby said set identifying bit indicates successful transmission of said last interface package transmittal and said reset identifying bit indicates retransmisssion of said last interface package transmittal.

4. A data communications method as in claim 1 wherein said uplink packets have a format comprising:
- at least one bit identifying the start of each uplink packet;
- a plurality of bits forming a packet core containing said tool data; and
- at least one redundancy bit for error detection.

5. A data communications method as in claim 4 wherein said packet core has a format comprising:
- at least one bit identifying packet data; and
- at least one bit identifying the length of said packet data.

6. A data communications method as in claim 5 wherein said packet data has a format comprising:
- at least one bit for communicating message data from said tool.

7. A data communications method as in claim 1 wherein said uplink superpacket has a format comprising:
- at least one bit identifying the start of said uplink superpacket;
- a plurality of bits forming an uplink superpacket data field; and
- at least one redundancy bit for error detection.

8. A data communications method as in claim 7 wherein said uplink superpacket data field comprises a plurality of bits for communicating data from each of said tools on said tool bus.

* * * * *